United States Patent
Kuhnle et al.

(10) Patent No.: US 8,285,624 B2
(45) Date of Patent: *Oct. 9, 2012

(54) SYSTEM, METHOD, AND PROGRAM PRODUCT FOR MANAGING A COLLECTIVE INVESTMENT VEHICLE INCLUDING A TRUE-UP OPERATION

(75) Inventors: Paul Edward Kuhnle, Doylestown, PA (US); George Tedesche Simon, Evanston, IL (US); John Stuart Thomas, Morristown, NJ (US); Mark Steven Criscitello, Colts Neck, NJ (US); Daniel Joseph McCabe, Upper Saddle River, NJ (US)

(73) Assignee: D12 Ventures, LLC, Bedminster, NJ (US)

( * ) Notice: Subject to any disclaimer, the term of this patent is extended or adjusted under 35 U.S.C. 154(b) by 153 days.

This patent is subject to a terminal disclaimer.

(21) Appl. No.: 12/896,295

(22) Filed: Oct. 1, 2010

(65) Prior Publication Data

US 2012/0023035 A1 Jan. 26, 2012

Related U.S. Application Data

(63) Continuation-in-part of application No. 11/758,564, filed on Jun. 5, 2007, now Pat. No. 7,813,987.

(60) Provisional application No. 61/252,449, filed on Oct. 16, 2009, provisional application No. 61/297,691, filed on Jan. 22, 2010.

(51) Int. Cl.
G06Q 40/00 (2006.01)
(52) U.S. Cl. .............. 705/36 R; 705/35; 705/37
(58) Field of Classification Search ............... 705/35–37
See application file for complete search history.

(56) References Cited

U.S. PATENT DOCUMENTS

| | | | |
|---|---|---|---|
| 6,879,964 B2 | 4/2005 | Sauter et al. | |
| 7,099,838 B1 | 8/2006 | Gastineau et al. | |
| 7,283,978 B2 * | 10/2007 | Frankel et al. | 705/35 |
| 7,461,027 B1 | 12/2008 | Volpert | |
| 2003/0065519 A1 | 4/2003 | Gibson et al. | |
| 2004/0143502 A1 * | 7/2004 | McClung, III | 705/14 |
| 2004/0172349 A1 * | 9/2004 | Quinn et al. | 705/35 |
| 2004/0186803 A1 | 9/2004 | Weber et al. | |

(Continued)

OTHER PUBLICATIONS

Shapiro, et al., "Application for an Order under Section 6(c) of the Investment Company Act of 1940 . . . ", Sep. 1, 2011, Security and Exhange Commission, Available at: http://www.sec.gov/Archives/edgar/data/1006249/000119312511239094/d40app.htm#tx222897_27.*

(Continued)

*Primary Examiner* — Ryan D Donlon
(74) *Attorney, Agent, or Firm* — Foley and Lardner LLP

(57) ABSTRACT

A method for managing redemptions, the method comprising: receiving, a request to redeem shares of a fund for a given market participant (MP), comprising a number of shares to redeem or a value-specifying parameter; communicating before a strike time an identification of a set of assets to distribute including a number of each one of the assets, to a MP representative, which MP representative is restricted from liquidating and disclosing the set of assets; calculating, a true-up amount, based on a monetary value at the strike time of the set of assets and either the monetary value as of the strike time of the number of shares requested to be redeemed, or the monetary value as of the strike time comprising a number of shares approximated by the value-specifying parameter, causing a transfer of all or a portion of the set of assets to the MP representative.

26 Claims, 6 Drawing Sheets

U.S. PATENT DOCUMENTS

| | | | |
|---|---|---|---|
| 2004/0186830 | A1 | 9/2004 | Delic et al. |
| 2005/0187857 | A1 | 8/2005 | Tull, Jr. |
| 2005/0262010 | A1 | 11/2005 | Tull et al. |
| 2006/0080200 | A1* | 4/2006 | Ashton et al. ............... 705/35 |
| 2006/0100955 | A1 | 5/2006 | Baldassini et al. |
| 2006/0253376 | A1 | 11/2006 | Seale et al. |
| 2007/0016514 | A1 | 1/2007 | Al-Abdulqader et al. |
| 2007/0022039 | A1 | 1/2007 | Brennan |
| 2007/0027790 | A1 | 2/2007 | Gastineau et al. |
| 2007/0078738 | A1 | 4/2007 | Levin et al. |
| 2007/0239584 | A1 | 10/2007 | Fross et al. |
| 2007/0294161 | A1 | 12/2007 | Johnson et al. |
| 2009/0063363 | A1 | 3/2009 | Present et al. |
| 2009/0063366 | A1 | 3/2009 | Friedman et al. |
| 2009/0083196 | A1 | 3/2009 | Volpert |
| 2009/0299908 | A1* | 12/2009 | Lindstrom et al. .......... 705/36 R |
| 2010/0076883 | A1* | 3/2010 | Lutnick et al. ............... 705/37 |
| 2011/0060676 | A1* | 3/2011 | Jennings ...................... 705/37 |
| 2011/0196777 | A1* | 8/2011 | Friedman et al. ............. 705/37 |

OTHER PUBLICATIONS

Dellva, W "Exchange-Traded Funds Not for Everyone", Journal of Financial Planning, Apr. 2001.

Deville, L., "Exchange Traded Funds: History, Trading and Research", Paris-Dauphine University, Jun. 2006.

DR, "Actively Managed ETFs are One Step Closer", DoughRoller, May 2010, 3 pgs.

Light, "Will Stock-Picking Managers Be the Next Big Thing for ETFs?", The Wall Street Journal, Jan. 6, 2010, 3 pages. [Underlining and Bolding added.].

Marquez, "Actively managed ETFs pique interest of big fund companies Funds and providers both expect to more than double in 2010", InvestmentNews, Jan. 4, 2010, 3 pages [Underlining and Bolding added.].

Maxfy, Daisy, "A More Active Role—Mutual funds, beware: ETFs increasingly are moving beyond indexes", The Wall Street Journal, Jul. 6, 2009, 3 pgs.

News Journal Editor, "Blind trusts for trust To avoid conflict of private gain by public action," News Journal, Mar. 10, 2006, p. 04.

Nigam, Shishir, "Disclosure of Actively Managed ETFs: Separating Fact From Fiction", Seeking Alpha a, Apr. 14, 2010, 2 pgs.

Poterba et al., "Exchange-Traded Funds: A New Investment Option for Taxable Investors", The American Economic Review, May 2002, pp. 422-427, vol. 92, No. 2.

Rosella et al., "The Evolution of the Exchange-Traded Fund: Is Active Management on the Horizon?", Journal of Investment Compliance, 2006, pp. 44-50, vol. 7 No. 3.

Schmerken, I. "Asset Managers Push Custodians to Offer Independent Pricing Services for OTC Derivatives", Feb. 13, 2007.

U.S. Securities and Exchange Commission, "SEC Concept Release: Actively Managed Exchange-Traded Funds", May 18, 2004, 17 CFR Part 270.

* cited by examiner

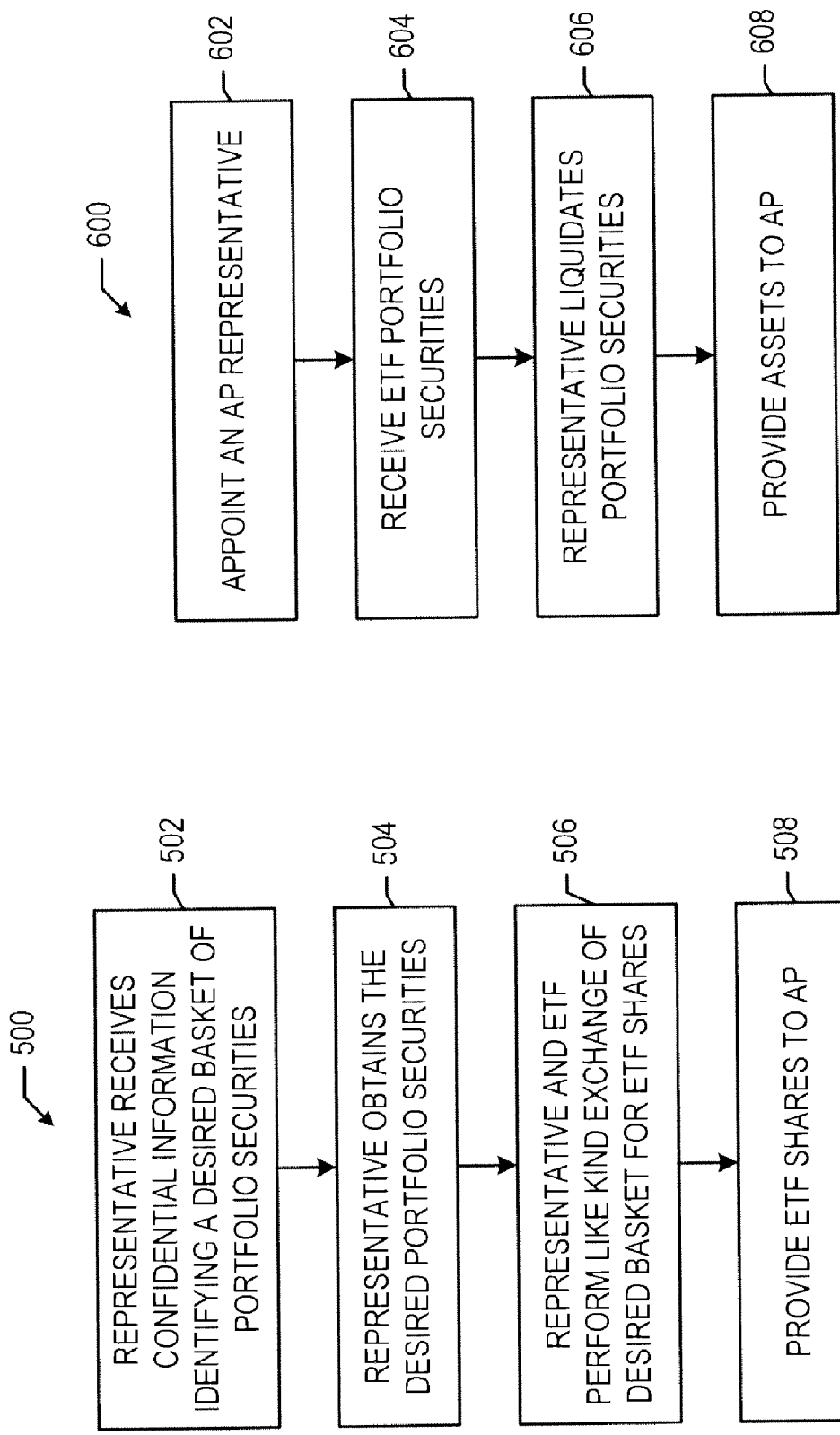

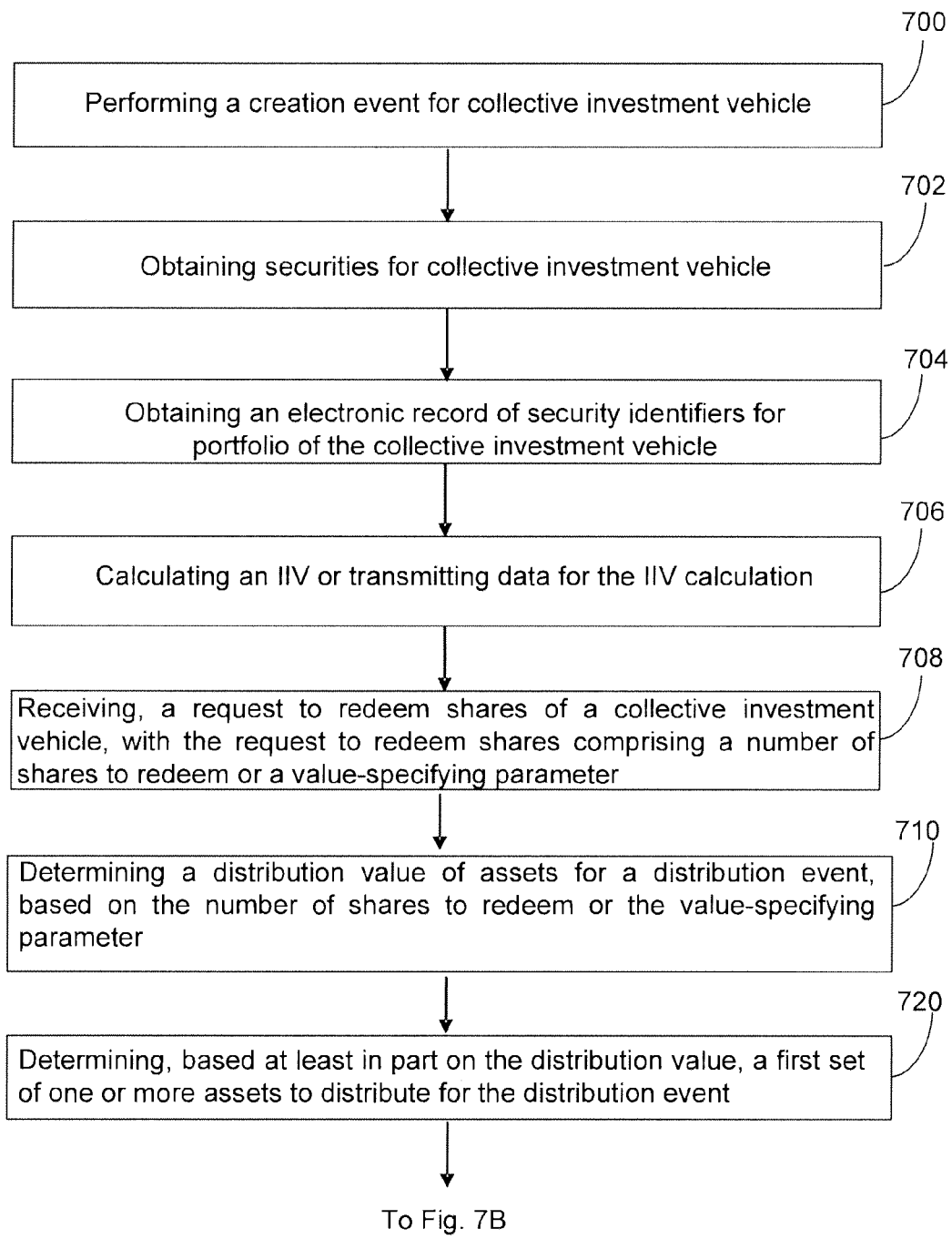

SYSTEM, METHOD, AND PROGRAM PRODUCT FOR MANAGING A COLLECTIVE INVESTMENT VEHICLE INCLUDING A TRUE-UP OPERATION

CROSS-REFERENCE TO RELATED PATENT APPLICATIONS

This application is a Continuation-In-Part of U.S. application Ser. No. 11/758,564, filed Jun. 5, 2007. This application also claims priority from Provisional Application U.S. Application 61/252,449, filed Oct. 16, 2009, and from Provisional Application U.S. Application 61/297,691, filed Jan. 22, 2010. The contents of the aforesaid applications are hereby incorporated by reference in their entirety.

FIELD OF THE INVENTION

The present invention relates to collective investment vehicles. More particularly, the present invention relates to a mechanism for managing redemption and creation events for collective investment vehicles.

BACKGROUND

Collective investment vehicles comprise any entity that allows investors to pool their money and invest the pooled funds, rather than buying securities directly. A variety of examples of collective investment vehicles will be described in the detailed description of the embodiments. For convenience, examples of some embodiments of the invention will be described in the context of exchange traded funds, but the type of collective investment vehicle is not limiting on the invention. The invention will be described in relation to "market participants" ("MP's"). An MP is any person or entity that wants to create or redeem shares in the collective investment vehicle. One non-limiting example of an MP is an authorized participant, to be discussed below in relation to exchange traded funds.

Exchange Traded Funds, or ETFs, are a type of collective investment vehicle that owns a portfolio of securities and issues shares that are traded on a stock exchange or other organized market. Shares of an ETF are created by authorized participants (AP) who either deliver cash, a portfolio of securities, or a combination of cash and securities to the ETF, and receive ETF shares in return. ETF shares may also be redeemed by APs by delivering ETF shares and receiving cash, securities or a combination thereof. An AP may create or redeem ETF shares. Typically, other investors buy or sell ETF shares in an organized market.

All ETFs must be approved for issuance by the Securities and Exchange Commission (SEC).

In order to approve an ETF for issuance, the SEC has required that the market trading the ETF disseminate an indicative value of the ETF shares every 15 seconds during trading hours.

BRIEF SUMMARY OF THE INVENTION

In one embodiment, a method for managing redemptions for a collective investment vehicle is disclosed, comprising: performing a creation event, comprising: receiving a request to create one or more shares of the collective investment vehicle; receiving an asset from one of the MP's in relation to the creation event; issuing, by one or more computers and an electronic network, one or more collective investment vehicle shares directly or indirectly to the respective one MP based on the asset received; obtaining securities for the collective investment vehicle to become a part of the portfolio of securities; obtaining or creating an electronic record of security identifiers for the portfolio of securities held by the collective investment vehicle; calculating and disseminating automatically an intraday indicative value (IIV), by one or more computers programmed to calculate the IIV, the calculating based on or derived from the electronic record of the portfolio of securities in the collective investment vehicle, or transmitting data electronically, by the one or more computers, of contents of the portfolio of securities to one or more third parties for a calculation and dissemination of the IIV; performing a redemption event, comprising: receiving, a request to redeem shares of the collective investment vehicle for a given MP, with the request to redeem shares comprising a number of shares to redeem or a value-specifying parameter; determining a distribution value of assets for a distribution event, based on the number of shares to redeem or the value-specifying parameter; determining, based at least in part on the distribution value, a first set of one or more assets to distribute for the distribution event, comprising commodities, or securities, or legal instruments, or comprising at least two selected from a group of cash, commodities, securities or legal instruments; communicating before a strike time an identification of the first set of one or more assets to distribute including a number of each one of the assets, to a market participant representative (MP representative), acting on behalf of the given MP for which the collective investment vehicle shares were received, which MP representative is governed by an agreement imposing a restriction on liquidation and disclosure of the first set of assets; calculating, by one or more computers, a monetary value of the first set of assets as of the strike time based on price data valid as of the strike time; calculating, by one or more computers, a monetary value as of the strike time of the number of shares requested to be redeemed, or a monetary value as of the strike time of a number of shares approximated by the value-specifying parameter; calculating, by one or more computers, a redemption true-up monetary amount, based on the monetary value at the strike time of the first set of one or more assets and either the monetary value as of the strike time of the number of shares requested to be redeemed, or the monetary value as of the strike time comprising a number of shares approximated by the value-specifying parameter, to obtain the redemption true-up monetary amount; sending, by one or more computers and an electronic network, an electronic message to cause a transfer of all or a portion of the first set of assets directly or indirectly to an electronic account of the MP representative; and further comprising: requiring appointment of the respective MP representative to act for the respective given MP in at least one or more redemption events with the collective investment vehicle, with the MP representative subject to terms that govern the actions of the MP representative and at least requires a confidentiality restriction regarding an identity of all or a portion of the first set of one or more assets with respect to the MP and a liquidation parameter for all or a portion of the first set of one or more assets, and wherein the receiving an asset from the one MP for the creation event comprises receiving one or more securities for a creation basket in an account transfer from or on behalf of the one MP and/or cash from or on behalf of the one MP or a combination thereof.

In a further embodiment, the restriction on confidentiality is limited in time.

In a further embodiment, the restriction on liquidation imposes a timing or volume restriction for liquidation of some or all of the first set of assets.

In a further embodiment, the restriction on liquidation imposes a methodology requirement for the liquidation of some or all of the first set of assets.

In a further embodiment, the collective investment vehicle is an actively managed collective investment vehicle.

In a further embodiment, the collective investment vehicle is an exchange traded fund (ETF).

In a further embodiment, the request to redeem comprises the number of shares to be redeemed, and further comprising: calculating, by one or more computers, using a predetermined valuation algorithm, a monetary value as of the strike time, of the number of shares that were requested for redemption; and wherein the calculating the redemption true-up amount step comprises determining a difference between the monetary value of the first set of one or more assets and the monetary value of the number of shares that were requested to be redeemed as of the strike time.

In a further embodiment, the request to redeem comprises the value-specifying parameter, and wherein the calculating the redemption true-up amount step comprises determining a difference between the monetary value of the first set of one or more assets and a monetary value of shares that equal or approximate the value of the value-specifying parameter as of the strike time.

In a further embodiment, operations are disclosed of obtaining an NAV for the shares of the collective investment vehicle; calculating, by the one or more computers, a number of shares to redeem as of the strike time based on the value-specifying parameter and the NAV for the shares of the collective investment vehicle; and communicating that number of shares to be redeemed directly or indirectly to the MP representative of the given MP.

In a further embodiment, an operation is disclosed of adding a value of a fractional share to the redemption true-up amount.

In a further embodiment, the communicating an identification of one or more of the first set of one or more assets to distribute, for the distribution event, to the MP representative for the given MP of the collective investment vehicle for whom the redemption is taking place, comprises transmitting, via the one or more computers and the one or more networks, an electronic message comprising identification information of one or more of the first set of assets, before the strike time.

In a further embodiment, the collective investment vehicle comprises a confidential portfolio of securities.

In a further embodiment, the receiving the request to redeem shares step comprises receiving an electronic request, via one or more electronic networks and the one or more computers In a further embodiment, the determining the first set of assets to distribute further comprises: calculating, by the one or more computers, a profit value or a loss value for each of a respective one or more purchase lots of each of more than one of the securities in the portfolio of securities; and selecting securities to distribute in the first set of assets, in part based on the profit value or loss value for each of the respective one or more purchase lots of the plurality of securities.

In a further embodiment, the strike time is a market close time.

In a further embodiment, an operation is disclosed of sending an electronic message, by the one or more computers and one or more networks, to cause a distribution of assets equal to the redemption true-up monetary value.

In a further embodiment, one or more of the steps of calculating, by one or more computers, comprises the collective investment vehicle or its agent contracting to direct one or more third parties to perform on behalf of the collective investment vehicle, by computer, one or more of the calculating steps using one or more prescribed algorithms for one or more prescribed times.

In a further embodiment, the collective investment vehicle or its agent directs, by contract, a third party to perform at least one of said steps.

In a further embodiment, the collective investment vehicle comprises a plurality of securities in a confidential portfolio of securities, and further comprising: the collective investment vehicle or its agent entering one or more agreements with one or more third parties, directing the one or more third parties to perform at least one of the calculating steps on behalf of the collective investment vehicle using prescribed algorithms, wherein the one or more agreements require the third parties to maintain in confidence information about contents of the confidential portfolio of securities of the collective investment vehicle; and transmitting electronically, by the one or more computers and an electronic network, information relating to the confidential portfolio of securities to at least one of the one or more third parties that is directed to perform at least one of the calculating steps.

In a further embodiment, the collective investment vehicle is an actively managed exchange traded fund (ETF) holding a confidential portfolio of securities, and further comprising: the collective investment vehicle or its agent entering one or more agreements with one or more third parties, directing the one or more third parties to perform one or more calculations on behalf of the collective investment vehicle to obtain the IIV; and the collective investment vehicle or its agent sending an electronic message, by the one or more computers and one or more networks, to cause transfer of the redemption true-up monetary amount of funds.

In a further embodiment, the collective investment vehicle is a closed-end fund.

In a further embodiment, the collective investment vehicle is an index fund. In yet a further embodiment, the collective investment vehicle is a proprietary index fund.

In a further embodiment, the collective investment vehicle comprises a plurality of securities in a confidential portfolio of securities, and further comprising: the collective investment vehicle or its agent directing one or more third parties by one or more contracts, to perform one or more calculations on its behalf, by computer, to obtain the IIV; and sending, by the one or more computers and one or more networks, one or more electronic messages comprising information based on a composition of the confidential portfolio of securities, to one or more of the one or more of the third parties for making calculations.

In a further embodiment, operations are disclosed of generating by the ETF or having generated on its behalf, by the one or more computers, an application programming interface (API) to select one or more assets of the collective investment vehicle to distribute as the first set of assets in response to the request to redeem the shares of the collective investment vehicle.

In a further embodiment, operations are disclosed of generating or having generated, by the one or more computers, an application programming interface (API) to receive requests to redeem shares and/or to create shares of the collective investment vehicle; and aggregating or netting, or having aggregated or having netted on behalf of the collective investment vehicle, shares from a plurality of the requests to redeem and/or create shares, by the one or more computers, to obtain a total number of shares to redeem in the method for the redemption event or a total number of shares to create in the creation event.

Note that the present method can be performed multiple times a day for multiple different strike times.

In a further embodiment, the method comprises determining if a redemption basket for the collective investment is disclosed; and only performing the steps for the redemption event in accordance with the method when the redemption basket for the collective investment vehicle is not disclosed.

In a further embodiment, the method comprises determining if a redemption basket for the collective investment represents or does not represent the actual portfolio of the collective investment vehicle; and only performing the steps for the redemption event in accordance with the method when the redemption basket for the collective investment vehicle does not represent the actual portfolio of the collective investment vehicle.

In a further embodiment, the method comprises determining whether to net collective investment vehicle shares from one or more creation events and one or more redemption events based on one or more criteria; if it is determined that netting is to be performed, then netting shares from one or more of the creation events with shares from one or more of the redemption events to obtain a net number of shares; and using the net number of shares in the performance of the creation event or the performance of the redemption event.

In a yet further embodiment, a system for managing redemptions for a collective investment vehicle with a portfolio of securities, in relation to one or more market participants (MP's) is disclosed, comprising: one or more computers comprising memory wherein the memory stores computer-readable instructions comprising program code that, when executed, cause the one or more computers to be configured with the following components: a component for performing a creation event, comprising a component for receiving a request to create one or more shares of the collective investment vehicle and a component for issuing, by one or more computers and an electronic network, one or more collective investment vehicle shares directly or indirectly to an electronic account of the respective one MP based on receiving in an electronic account an asset from one of the MP's in relation to the creation event; a component for obtaining or creating an electronic record of security identifiers for the portfolio of securities held by the collective investment vehicle; a component for obtaining securities for the collective investment vehicle to become a part of the portfolio of securities; a component for calculating and disseminating automatically an intraday indicative value (IIV), by one or more computers programmed to calculate the IIV, the calculating based on or derived from the electronic record of the portfolio of securities in the collective investment vehicle, or transmitting data electronically, by the one or more computers, of contents of the portfolio of securities to one or more third parties for a calculation and dissemination of the IIV; a component for performing a redemption event, comprising: a component for obtaining, by the one or more computers, a request to redeem shares of the collective investment vehicle for a given MP, with the request to redeem shares comprising a number of shares to redeem or a value-specifying parameter; a component for communicating, by the one or more computers and one or more electronic networks, before a strike time an identification of a first set of one or more assets to distribute including a number of each one of the assets, to a market participant representative (MP representative), acting on behalf of the given MP for which the collective investment vehicle shares were received, which MP representative is governed by an agreement imposing a restriction on liquidation and disclosure of the first set of assets; wherein the first set of assets is determined based at least in part on the number of shares to redeem or the value-specifying parameter, and wherein the first set of one or more assets comprises commodities, or securities, or legal instruments, or comprises at least two selected from a group of cash, commodities, securities or legal instruments; a component for calculating, by one or more computers, a monetary value of the first set of assets as of the strike time based on price data valid as of the strike time; a component for calculating, by one or more computers, a monetary value as of the strike time of the number of shares requested to be redeemed, or a monetary value as of the strike time of a number of shares approximated by the value-specifying parameter; a component for calculating, by one or more computers, a redemption true-up monetary amount, based on the monetary value at the strike time of the first set of one or more assets and either the monetary value as of the strike time of the number of shares requested to be redeemed, or the monetary value as of the strike time comprising a number of shares approximated by the value-specifying parameter, to obtain the redemption true-up monetary amount; a component for sending, by one or more computers and an electronic network, an electronic message to cause a transfer of all or a portion of the first set of assets directly or indirectly to an electronic account of the MP representative; and wherein the agreement with the given MP to establish the respective MP representative to act for the respective given MP in at least one or more redemption events with the collective investment vehicle comprises terms that govern the actions of the MP representative and at least requires a confidentiality restriction regarding an identity of all or a portion of the first set of one or more assets with respect to the MP and a liquidation parameter for all or a portion of the first set of one or more assets, and wherein the asset from the one MP for the creation event comprises one or more securities for a creation basket in an account transfer from or on behalf of the one MP and/or cash from or on behalf of the one MP or a combination thereof.

In a further embodiment the system comprises a component for generating or having generated on its behalf, by the one or more computers, an application programming interface (API) to receive requests to redeem and/or to create shares of the collective investment vehicle; and a component for aggregating or netting, or having aggregated or having netted on behalf of the collective investment vehicle, a number of shares from a plurality of the requests to redeem shares and/or to create shares, by the one or more computers, to obtain a total number of shares to redeem in the method for the redemption event or a total number of shares to create in the creation event.

In a further embodiment, the system comprises a component for determining if a redemption basket for the collective investment is disclosed and only performing the steps for the redemption event in accordance with the method when the redemption basket for the collective investment vehicle is not disclosed.

In a further embodiment, the system comprises a component for determining if a redemption basket for the collective investment represents or does not represent the actual portfolio of the collective investment vehicle and only performing the steps for the redemption event in accordance with the method when the redemption basket for the collective investment vehicle does not represent the actual portfolio of the collective investment vehicle.

In a further embodiment, the system comprises a component for determining whether to net collective investment vehicle shares from one or more creation events and one or more redemption events based on one or more criteria; a component for netting shares from one or more of the creation events with shares from one or more of the redemption events to obtain a net number of shares, if it is determined that netting is to be performed; and a component for using the net number of shares in the performance of the creation event or the performance of the redemption event.

In a further embodiment, a program product for managing redemptions for a collective investment vehicle is disclosed, comprising: one or more computer-readable media having computer-readable program code embodied therein or among them if more than one computer-readable medium, the computer-readable program code comprising program code for causing the following method steps to be performed when executed by a computer: program code for performing a creation event, comprising program code for receiving a request to create one or more shares of the collective investment vehicle, program code for issuing, by one or more computers and an electronic network, one or more collective investment vehicle shares directly or indirectly to an electronic account of the respective one MP based on receiving in an electronic account an asset from one of the MP's in relation to the creation event; program code for obtaining or creating an electronic record of security identifiers for the portfolio of securities held by the collective investment vehicle; program code for obtaining securities for the collective investment vehicle to become a part of the portfolio of securities; program code for, calculating and disseminating automatically an intraday indicative value (IIV), by one or more computers programmed to calculate the IIV, the calculating based on or derived from the electronic record of the portfolio of securities in the collective investment vehicle, or for transmitting data electronically, by the one or more computers, of contents of the portfolio of securities to one or more third parties for a calculation and dissemination of the IIV; program code for performing a redemption event, comprising: program code for obtaining, by the one or more computers, a request to redeem shares of the collective investment vehicle for a given MP, with the request to redeem shares comprising a number of shares to redeem or a value-specifying parameter; program code for communicating, by the one or more computers and one or more electronic networks, before a strike time an identification of a first set of one or more assets to distribute including a number of each one of the assets, to a market participant representative (MP representative), acting on behalf of the given MP for which the collective investment vehicle shares were received, which MP representative is governed by an agreement imposing a restriction on liquidation and disclosure of the first set of assets; wherein the first set of assets is determined based at least in part on the number of shares to redeem or the value-specifying parameter, and wherein the first set of one or more assets comprises commodities, or securities, or legal instruments, or comprises at least two selected from a group of cash, commodities, securities or legal instruments; program code for calculating, by one or more computers, a monetary value of the first set of assets as of the strike time based on price data valid as of the strike time; program code for calculating, by one or more computers, a monetary value as of the strike time of the number of shares requested to be redeemed, or a monetary value as of the strike time of a number of shares approximated by the value-specifying parameter; program code for calculating, by one or more computers, a redemption true-up monetary amount, based on the monetary value at the strike time of the first set of one or more assets and either the monetary value as of the strike time of the number of shares requested to be redeemed, or the monetary value as of the strike time comprising a number of shares approximated by the value-specifying parameter, to obtain the redemption true-up monetary amount; program code for sending, by one or more computers and an electronic network, an electronic message to cause a transfer of all or a portion of the first set of assets directly or indirectly to an electronic account of the MP representative; and wherein the agreement with the given MP to establish the respective MP representative to act for the respective given MP in at least one or more redemption events with the collective investment vehicle comprises terms that govern the actions of the MP representative and at least requires a confidentiality restriction regarding an identity of all or a portion of the first set of one or more assets with respect to the MP and a liquidation parameter for all or a portion of the first set of one or more assets, and wherein the asset from the one MP for the creation event comprises one or more securities for a creation basket in an account transfer from or on behalf of the one MP and/or cash from or on behalf of the one MP or a combination thereof.

These as well as other aspects, advantages, and alternatives will become apparent to those of ordinary skill in the art by reading the following detailed description, with reference where appropriate to the accompanying drawings.

BRIEF DESCRIPTION OF THE DRAWINGS

FIGS. 5 and 6 are flow charts depicting some embodiments of creation and redemption events, respectively.

FIGS. 7A and 7B is a schematic block diagram of an embodiment of the invention.

DETAILED DESCRIPTION

Figure 1A:
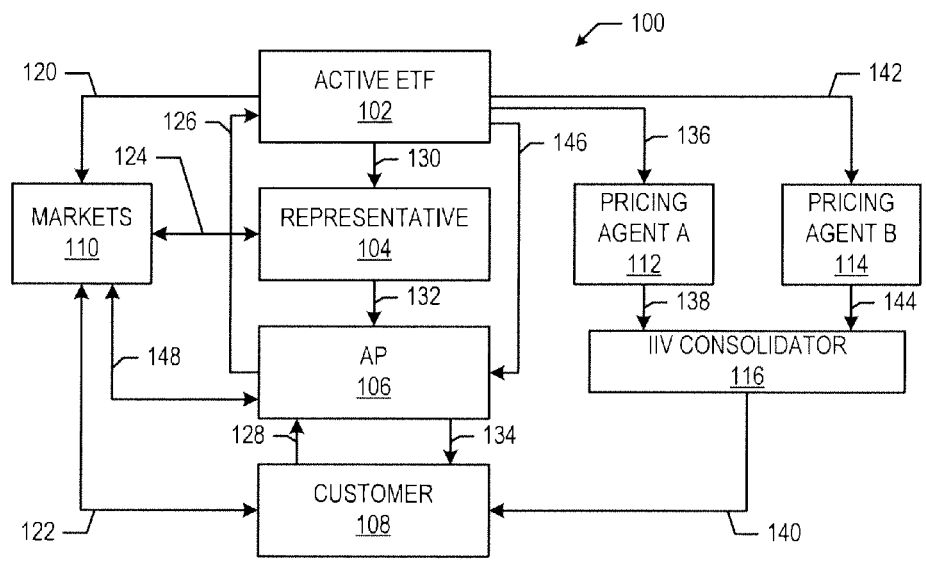
FIG. 1A is a block diagram depicting certain aspects of an ETF and AP representative combination, and transactions involved in one embodiment of a creation event.

The present invention comprises a management system, method and program product for managing redemptions, and in some embodiments, creations, for a collective investment vehicle, with the system, method and program product configured with a true-up operation.

As noted, collective asset vehicles comprise any entity that allows investors to pool their money and invest the pooled funds, rather than buying securities directly. A collective investment vehicle may be rigidly structured, as in an asset-backed security, or it may be more basic, like a stock or bond. An investment vehicle may involve the purchase of a debt obligation, with entitlement to repayment with interest, or it may involve buying an ownership stake in a business, with the hope that the business will become profitable. An example of a collective investment vehicle is an exchange-traded fund (ETF). Another example is mutual fund.

As noted, the invention will be described in relation to a "market participant" ("MP"), which is any person or entity that wants to create or redeem shares in the collective investment vehicle.

Note that in one embodiment, the AP representative is a broker and the agreement with the AP representative imposes a confidentiality restriction on the AP representative that requires that all or a portion of the first set of assets not be disclosed to the AP, and/or anyone else for some period of time, e.g., 1 day, 2 days, a week, for example, including permanently.

In another embodiment, the agreement with the AP representative may impose requirements on liquidation timing for some or all of the first set of assets, such as that all or a portion of stock shares in the first set of assets be liquidated among a given number of brokers anonymously, within a given time period after first disclosure of the first set of assets to the AP representative. The AP representative may also be required by agreement to liquidate only designated securities, or security types. Additionally, the requirement for liquidation may include a another timing requirement, e.g., only a portion of the assets may be liquidated immediately, and there must be a delay or several delays to liquidate the other portions of the remainder of the assets. Additionally, in one embodiment, the agreement with the AP representative may include a restriction on the markets used for the liquidation, e.g., only a portion of the assets to be liquidated or only certain types of securities or designated securities may be sold in a given market. In an embodiment, the underlying securities and other assets in the portfolio may not be confidential, but the identity of the assets being liquidated will be held confidential for some period of time including permanently.

As noted, an example of a collective investment vehicle is an exchange traded fund (ETF). Creation and redemption mechanisms for an Exchange Traded Fund (ETF) are described below as one example of the present invention in relation to collective investment vehicles. The creation and redemption mechanisms, in one embodiment for an actively traded ETF, comprise computer systems and methods for an authorized participant (AP) or other MP to create ETF shares, without an AP directly delivering the portfolio securities to the ETF, and to redeem ETF shares without the AP learning the identity of an underlying portfolio securities of the ETF, at least for some period of time, or in some embodiments, permanently. The creation and redemption mechanisms may involve in one embodiment, the use of a blind trust, power of attorney, agency or bailment agreement or any other mechanism that withholds the identity of the portfolio securities from the AP or other MP.

In one embodiment, a method of administering an ETF comprises a method of creating shares in the ETF. In one embodiment, the AP may provide the ETF with cash, which is referred to as a cash creation. The amount of cash required may be determined in response to a number of ETF shares requested for creation and the net asset value of the ETF's assets, e.g., the value of an ETF share. In an alternative embodiment, the method comprises appointing or having appointed a respective authorized participant representative (AP representative) to act on behalf of a respective AP for purposes of creating shares in the ETF. In this embodiment, when an AP initiates creation of ETF shares, it may deposit cash with it respective AP representative with instructions to provide the cash to the ETF to create the ETF shares. Alternatively, the AP may provide instructions to the AP representative to buy and/or borrow necessary portfolio securities to deliver to the ETF a creation basket of securities. In this embodiment, the ETF provides to the AP representative confidential data records containing information regarding desired contents of the creation basket. In embodiments where the securities are borrowed, the AP representative is authorized to pay an appropriate fee to the entity that loaned the securities. To complete the creation, ETF shares may be electronically transferred directly to an electronic account of the AP, or may be electronically transferred to the AP via an electronic account of the AP representative.

In particular, in one embodiment creations may be performed by an AP representative electronically receiving confidential creation-basket data records specifying a desired basket of portfolio securities for a creation event; the AP representative obtaining the desired basket of portfolio securities; the AP representative electronically transferring the desired basket of portfolio securities to the ETF; wherein the AP does not have access to the confidential creation-basket data records specifying the desired basket of portfolio securities.

In an additional embodiment, the method of administering the ETF includes a method of redeeming shares in the ETF. In this embodiment, an AP may redeem ETF shares by providing the ETF with the ETF shares directly, or may provide them to the ETF via the AP representative. To complete the redemption, the ETF will deliver portfolio securities to the AP representative, who will then sell or otherwise liquidate those securities on the open market (or return them, if borrowed) on behalf of the AP, without disclosing their identity to the AP, and remit the cash proceeds to the AP.

In one embodiment, the method of redeeming shares of an ETF comprises providing a request to redeem ETF shares; an AP representative electronically receiving portfolio securities from the ETF as a result of a redemption of ETF shares, while ensuring that the identity of the portfolio securities is not disclosed to the AP; the AP representative obtaining transferable assets in exchange for the portfolio securities; and providing the transferable assets to the AP.

In another embodiment, redemptions may comprise receiving a request to redeem ETF shares; identifying a redemption basket of portfolio securities; and electronically transferring the redemption basket of portfolio securities to an AP representative as part of a redemption of ETF shares, while ensuring that the identity of the redemption basket of portfolio securities is not disclosed to the AP.

In one embodiment, a relationship with an AP representative, or MP representative for other example embodiments, may be established by the AP as part of an agreement between and AP and the ETF, and this agreement, in one embodiment, may comprise an exhibit to an ETF registration statement filed with SEC. The AP representative may be selected by the ETF, or at least approved by ETF, as set out in the ETF-AP agreement. The actions of the AP representative are governed by instructions according to the ETF-AP agreement, which may be reflected in a direct agreement with the AP representative, with the instructions requiring that the identity of the underlying portfolio securities not be disclosed to the AP. In one embodiment, an instruction may be included requiring the AP representative to liquidate all or a substantial portion of securities received from the ETF in a redemption event, in order to maintain the identities of the securities identified for the redemption confidential with respect to the AP. Additionally, the receipt of the underlying portfolio securities by the AP representative (e.g., into the blind trust) is part of a like-kind exchange of ETF shares for the delivered underlying portfolio securities between an AP and an ETF.

In one embodiment, the ETF or other collective investment vehicle disseminates or has disseminated an intraday indicative value (IIV) of the ETF by providing the contents of its portfolio to a pricing service pursuant to the terms of a confidentiality agreement. In another embodiment, the portfolio is divided among two or more pricing services, such that neither pricing service knows the identity of the entire portfolio. In this embodiment, the ETF, or listing exchange, or an agent of either, uses the received prices to calculate the intraday indicative value for public dissemination.

In one embodiment, the IIV is determined by electronically transmitting a plurality of partial position data records containing partial position information to a plurality of pricing agents; electronically receiving partial pricing data; automatically computing an IIV; and electronically publishing the IIV via a data communication feed. The methods may be performed using a computer readable storage medium having stored therein instructions to cause a microprocessor to: electronically receive partial pricing data and automatically compute an IIV; and, electronically transmit the IIV via a data communication feed. The computer readable storage medium may also include instructions to transmit a plurality of partial position data records containing partial position information to a plurality of pricing agents. In one embodiment, the pricing data from the multiple pricing agents is received by the ETF or other collective investment vehicle, or is received by a consolidator on behalf of the ETF or other collective investment vehicle, and an IIV is calculated and transmitted electronically for dissemination to the market.

With reference to FIG. 1A, an embodiment of system and method 100 of administering an exchange traded fund (ETF) is described. While the methods and systems described herein may be used for any type of ETF, or other collective investment vehicle, they are particularly beneficial in conjunction with actively managed ETFs or other actively managed collective investment vehicles, such as closed-end funds, as well as for proprietary indexes. An ETF 102 may engage in market transactions 120 with markets 110. Customers 108 and an agent or AP representative 104 may also engage in market transactions 122, 124, respectively. The authorized participant (AP) 106 interacts with the ETF 102 either directly as shown by transaction 126, or via the AP representative 104 as shown by transactions 130, 132. The AP 106 may buy from and sell ETF shares for customers 108 as shown by transaction 128, 134, or in the market 110 as shown by transaction 148.

The transactions described herein involve the transfer of securities between various entities such as the ETF, the AP and the AP representative. It should be understood that the transfer of such securities is preferably performed electronically via suitable messaging formats and computer systems. For example, in one embodiment, the DTC (Depository Trust Company) or other suitable universal clearing service, provides a participant terminal system for transferring securities using electronic messaging. Thus, an electronic transfer of securities may be performed by sending an electronic message to the DTC. The DTC then performs a book entry movement by executing an accounting entry to move securities from one account to another account.

One aspect of an ETF is a calculation and reporting of the intraday indicative value, or IIV. In order to maintain the confidentiality of the holdings of the managed ETF, the ETF 102 may provide partial position information 136, 142 to a plurality of pricing agents, such as pricing agent A 112 and pricing agent B 114. The pricing agents then provide partial pricing data 138, 144 to an IIV consolidator 116. The IIV consolidator 116 consolidates the partial pricing data into an IIV, and provides the ETF IIV 140 to customers 108 (and to markets 110 generally). By using a plurality of pricing agents, the ETF manager is able to maintain the confidentiality of the precise makeup of the ETF 102.

Note that in one embodiment, the ETF or other collective investment vehicle may not need to require confidentiality of the IIV calculation. Such an embodiment would occur where the securities in the underlying funds are not maintained in confidence, but the AP representative or MP representative is used to maintain the identity and quantity of securities traded by the ETF or collective investment vehicle for, e.g., 1 hour, 6 hours, 1 day, 2 days, 1 week, to name a few, including permanently.

The ETF or collective investment vehicle 102 may be, for example, an actively managed fund wherein the ETF or collective investment vehicle manager engages in transactions in the market 110, as indicated by arrow 120, in order to alter the contents or holdings of the ETF or other collective investment vehicle 102. The ETF or other collective investment vehicle manager may also, or alternatively, alter the holdings of the ETF or collective investment vehicle through a series of creation and redemption events as described herein.

The AP or MP may be, in one embodiment, a bank, broker-dealer, exchange specialist, market maker, arbitrageur, exchange or, an investor. The AP or other MP may enter into an agreement with the ETF or other collective investment vehicle setting the terms for the creation and redemption of the ETF's or other collective investment vehicle shares. In one embodiment, creations and redemptions may be required to be in creation unit or redemption unit aggregations. In another embodiment, the creations and redemptions may not require creation and/or redemption aggregation units. In one embodiment, a representative relationship such as via a blind trust or other agency vehicle is established by the AP or other MP as part of the agreement between and AP or other MP and the ETF or other collective investment vehicle. The actions of the AP representative or other MP representative (e.g., trustee of the blind trust, agent, etc.) are governed by instructions specified, or agreed or approved by the ETF or other collective investment vehicle, and the instructions require that the identities of the underlying securities are not disclosed to the AP and that all or a substantial portion of the delivered securities are liquidated so that the AP or MP does not learn the identity of a substantial number of the securities in the portfolio of the ETF or other collective investment vehicle for at least some period of time, or indefinitely.

Figure 1B:
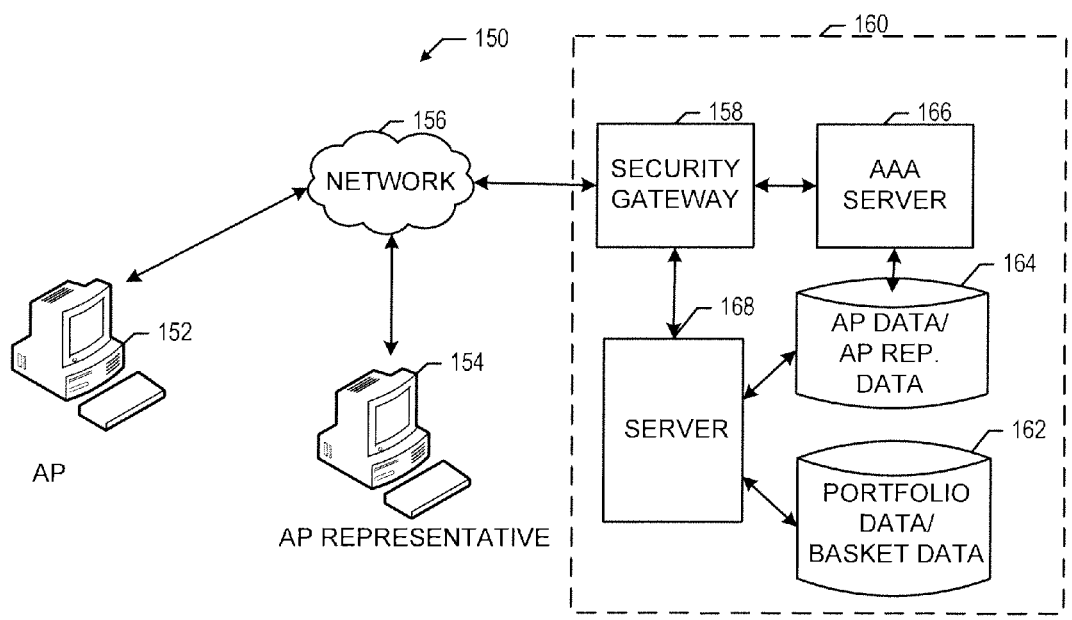
FIG. 1B is a block diagram of an embodiment of a computer system for implementing certain aspects of the ETF.

With reference to FIG. 1B, a computer system, or system networked computers 150, may be used to implement various transactions and data transfers associated with operation of the ETF or other collective investment vehicle described herein. The system 150 may include an AP or MP workstation 152, AP representative or MP representative workstation 154, and ETF or other collective investment vehicle system 160, which, in one embodiment, includes server 168, a database 162 which contains information relating to the ETF or other collective investment vehicle portfolio securities and creation and redemption basket data, and database 164 which contains data relating to the APs and AP representatives and/or MP's and MP representatives, such as identification information, password files, encryption keys, other access authorization and accounting (AAA) data. In this regard, ETF or other collective investment vehicle system 160 may optionally include AAA server 166 and a security gateway 158. The various components communicate over network 156, which may be a public network such as the Internet, or a private network including leased lines, or a virtual private network using virtual private network (VPN) protocols.

The various transactions and transfers described herein, in one embodiment, takes place using the systems and components shown in FIG. 1B, although one of skill in the art will appreciate that many variations of the system may be implemented without departing from the scope of the invention. Suitable networking protocols may be used, including the Transport Control Protocol/Internet Protocol (TCP/IP) suite of protocols, and also including the HyperText Transport Protocol (HTTP) and associated security protocols HTTPS, and other mechanisms such as Virtual Private Networking (VPN), Secure Sockets Layer (SSL), Transport Layer Security (TLS), tunneling protocols such as Generic Routing and Encapsulation (GRE), Layer 2 Tunneling Protocol (L2TP), and the like. Another protocol that may be used to facilitate the transactions and associated messaging described herein is the Financial Information eXchange (FIX) Protocol, which is a messaging standard developed specifically for the real-time electronic exchange of securities transactions. FIX is a public-domain specification owned and maintained by FIX Protocol, Ltd. In addition, some of the transactions may be communicated in a manual fashion, such as via telephone or textual messaging (email, and the like), whereupon the relevant transaction information may be keyed or otherwise entered into the appropriate computer systems.

FIG. 1A may be used to illustrate the transactions associated with a cash creation event. In particular, AP 106 provides cash to the ETF 102 as shown by transaction 126 or indirectly via an AP representative. In return, the ETF 102 issues ETF shares to the AP 106 as shown by transaction 146, which in one embodiment, may take place via electronic transfer from ETF system 160 directly to the AP computer system 152, or to a DTC electronic account of the AP, using network 156. Note that although this example and the other examples shown in FIGS. 1-6 are provided in the context of ETF's and AP's and AP representatives, it applies equally to other collective investment vehicles, MP's and MP representatives.

Figure 2:
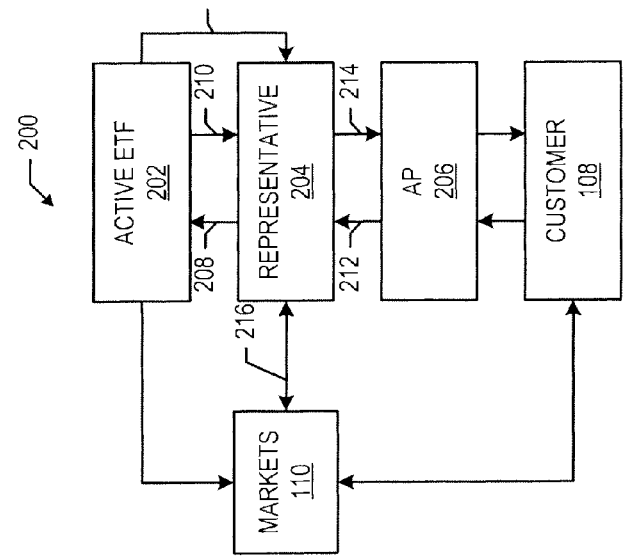
FIG. 2 is a block diagram depicting transactions relating to an alternative method of a creation event.

FIG. 2, in contrast, depicts the use of an AP representative 204 in the creation event. In method 200, the AP 206 provides the AP representative 204 with cash as shown in transaction 212. For example, the AP representative may electronically receive a cash transfer, the cash being a value equivalent of a creation basket. In order to assemble a creation basket of securities for delivery to the ETF, the ETF 402 provides AP representative 204 with information 218 to identify the desired securities for the creation basket.

In one embodiment, the AP or MP representative electronically receives confidential creation-basket data records specifying a desired basket of securities for a creation event or obtains this information by accessing a website or other Internet portal for the ETF or other collective investment vehicle. Creation-basket data records may be automatically created in response to an ETF manager identifying securities for the creation basket. The system then creates one or more confidential creation-basket data records specifying a desired basket of securities for a creation event. In one embodiment, the ETF or other collective investment vehicle manager accesses a portfolio management interface associated with server 168 that allows the manager to identify the creation baskets. The interface allows the ETF or other collective investment vehicle manager to prioritize the order in which different creation baskets are used when performing a series of creation events. In addition, the interface to server 168 allows designation of creation baskets in advance of any actual creation notifications. System 160 then electronically transfers the confidential creation-basket data records to the AP or MP representative system 154 upon request, while ensuring that the identity of the redemption basket of portfolio securities is not disclosed to the AP or MP for at least some period of time, including permanently.

The systems described above may include computer readable storage media for use with computer systems to effectuate certain steps described herein. In particular, the computer-readable media may contain instructions to cause a microprocessor to execute the following steps: receiving a request to create ETF shares; and transmitting confidential creation-basket data records specifying a desired basket of securities for a creation event.

While maintaining the information 218 in confidence, and not disclosing the information 218 to the AP 206, the AP representative 204 acquires the desired portfolio securities. In one embodiment, the AP representative obtains the desired portfolio securities via market 110 as shown by transaction 216. In an alternative embodiment, the AP representative 204 may obtain the underlying securities for the creation basket by borrowing some or all of the desired basket of securities. The AP representative then provides the desired creation basket to ETF 202 as shown by transaction 208. The ETF 202 then delivers shares of the ETF to the AP representative 204 as shown by transaction 210. In one embodiment, the AP representative electronically transfers the desired basket of securities to the ETF. That is, transaction 208 may be performed by sending an electronic message to the DTC or other universal clearing service with instructions to make a book transfer of the desired securities to an electronic account of the ETF 202. AP representative 204 then provides the ETF shares to an electronic account of the AP 206 as shown by transaction 214.

Information 218 may take the form of a confidential portfolio composition file provided only to AP representatives or MP representatives for purposes of creation events. The ETF may formulate unique composition files reflecting the ETF manager's desired acquisitions. The data may take the form of a plurality of confidential creation-basket data records specifying a desired basket of securities for a creation event. The acquisitions thus effectuated via creation events, together with the elimination or removal of specific underlying security assets via redemptions, allow the ETF manager to adjust or alter the portfolio composition without purchasing or selling securities directly.

Figure 3:
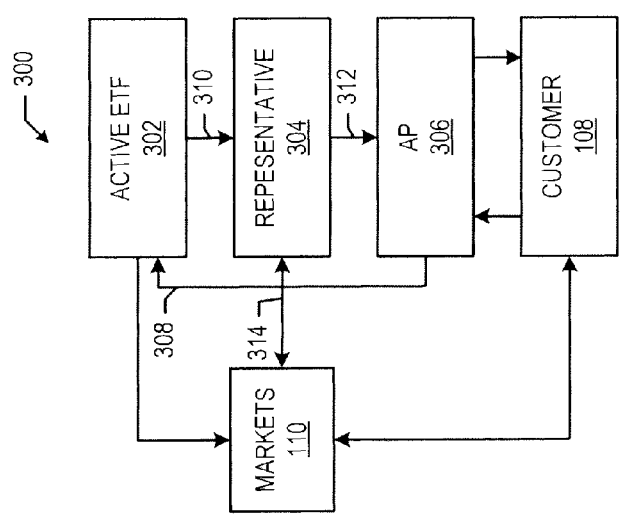
FIG. 3 is a block diagram depicting certain transactions relating to a redemption event using an ETF and an AP representative.

As shown in FIG. 3, one method 300 of performing a redemption comprises the AP or MP 306 providing ETF or other collective investment vehicle shares to the actively managed ETF or other collective investment vehicle 302 in transaction 308 or via the AP representative or MP representative 304. In exchange for the receipt of ETF or other collective investment shares, ETF or other collective investment vehicle 302 provides a basket of portfolio securities to the AP representative or MP representative 304 as shown by transaction 310. Transaction 308 may be performed by the AP or MP sending a message to the DTC or other universal clearing service to transfer ETF or other collective investment vehicle shares to the electronic account of the ETF or other collective investment vehicle. Transaction 310 may comprise the ETF or other collective investment vehicle sending a message to the DTC or other universal clearing service to transfer particular portfolio securities to the electronic account of the AP representative or the MP representative 304.

As noted, the selection of the underlying securities may be made by the ETF manager so as to alter or adjust the holdings of the ETF 302. In one embodiment, low-cost basis securities held in the ETF portfolio may be provided so as to retain only higher-cost basis securities, or only low-cost basis securities, or a mix thereof, or based on one or more objectives of the fund manager. The AP representative 304 then liquidates the portfolio securities, through market transactions or other transactions 314. The AP representative is then able to provide the AP 306 with cash, or other suitable instrument as shown by transaction 312. Note that although ETF 302 provides the portfolio securities to AP representative 304, the portfolio securities are assets rightfully belonging to AP 306.

Note that although the embodiments described comprise one or more agreement provisions requiring the AP representative or MP representative 304 to maintain the confidentiality of the identity of the portfolio securities provided to the AP representative or MP representative 304 by ETF or other collective investment vehicle 302, some embodiments may use an AP representative without this requirement.

Figure 4:
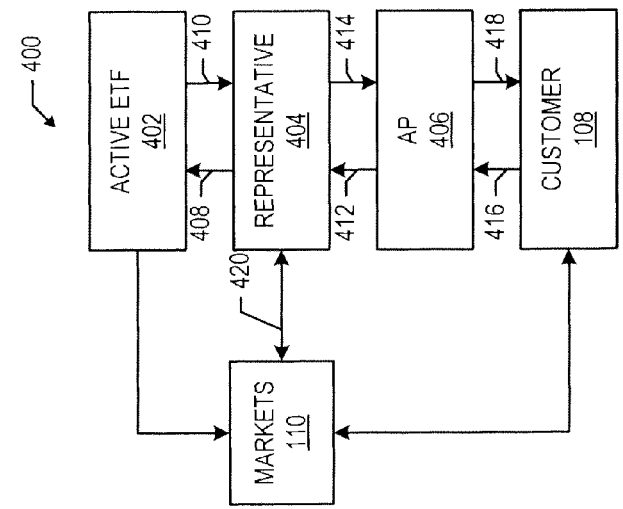
FIG. 4 is a block diagram depicting transactions used in an alternative redemption event.

With reference to FIG. 4, an alternative method 400 of performing a redemption event is described. AP 406 may provide AP representative 404 with an amount of ETF shares or a sufficient amount of cash in transaction 412. The AP representative 404 may then use the ETF shares (or buy ETF shares using the cash) and provide the shares to ETF 402 in transaction 408, preferably performed via a DTC transfer message to authorize an electronic transfer between accounts. ETF 402 provides a basket of portfolio securities to AP representative 404 as shown by transaction 410 via a DTC transfer message. Again, the identity of the basket of portfolio securities is held in confidence by AP representative 404 for at least some period of time, and such information is not provided to AP 406, or to any other individual or entity that is not obligated to maintain its confidentiality. The AP representative 404 then liquidates the portfolio securities, preferably using the market 110 as shown by transaction 420. The AP representative 404 then provides to the customer 108 via the AP cash or other suitable instruments as shown by transaction 418.

From the perspective of the ETF, the system 160 receives a request to redeem ETF shares. The request may come directly from the AP computer system 152, or via the AP representative system 154. Alternatively, the request may be communicated to system 160 via alternative communication methods, including phone, fax, email, etc., and the information keyed into the system. The ETF system then identifies a redemption basket of portfolio securities. This is preferably performed by an ETF manager, who creates one or more confidential redemption-basket data records specifying a desired basket of securities for a redemption event. In one embodiment, the ETF manager accesses a portfolio management computer interface associated with ETF server 168 that allows the manager to identify the securities for the redemption baskets. The interface, in one embodiment, allows the ETF manager to prioritize the order in which the redemption baskets are used when performing redemption events. In addition, the interface to the ETF server 168 allows designation of redemption baskets in advance of any actual redemption notifications. System 160 then electronically transfers the redemption basket of portfolio securities to an electronic account of the AP representative system 154, to ensure that the identity of the redemption basket of portfolio securities is not disclosed to the AP for at least some period of time, including permanently.

With reference to FIG. 5, a method 500 of performing a creation event is illustrated. The AP may establish a relationship with an AP representative such as by a blind trust agreement, power of attorney, agency agreement or bailment, or other suitable agency vehicle. The AP may provide the AP representative with cash, the cash being a value equivalent of a creation basket. At step 502 the AP representative may be given confidential information from the ETF regarding a desired basket of portfolio securities for the creation event. The AP representative may then obtain the portfolio securities at step 504, and then engage in a like kind exchange of the portfolio securities for ETF shares with the ETF at step 506. For a creation basket, the AP representative may obtain the underlying securities on the open market using the cash. Alternatively, the AP representative may borrow the underlying securities from another entity. The AP representative is authorized to pay an appropriate fee to the entity that loaned the underlying securities. The determination of whether to buy or borrow the portfolio securities may be based on the representative relationship agreement, and may be based on relative costs of engaging in the transactions on behalf of the AP. At step 508, the ETF shares are provided to the AP, thereby allowing the AP to sell the ETF shares in the market. The ETF shares may be provided directly to the AP from the ETF, or may pass through the AP representative.

With reference to FIG. 6, a method 600 of administering an ETF is described. Method 600 comprises requiring appointment of an AP representative to represent the AP at least for redemptions of ETF shares. This step may be implemented by the ETF appointing an AP representative at step 602, or requiring appointment of an AP representative. A requirement for an AP representative may comprise the ETF requiring the clearing system that facilitates transfer of the ETF shares, e.g., the DTC, to only accept redemptions and/or creations for its ETF shares from AP's represented by respective AP representatives, or to only accept order transfer communications on forms that automatically set up an AP representative. In one embodiment, the ETF may enter into an agreement with the AP to appoint an AP representative. In another embodiment, a purchase of a share of the ETF may automatically appoint an AP representative. In another embodiment, the ETF may have a right of approval of the AP representative or other input into the selection of the AP representative, and may specify specific provisions on confidentiality and liquidation. The method of imposing this requirement of an AP representative is not limiting on the invention.

The AP representative takes actions on behalf of the AP, but as noted, is precluded by the agreement from disclosing or taking actions that would result in disclosure of the securities of the ETF portfolio to the AP for at least some period of time including permanently. In method 600, the AP representative receives the portfolio securities from the ETF at step 604. In the case where a blind trust is used, the beneficiary of the blind trust is the AP associated with the ETF. The trust is a blind trust because the trustee manages the assets of the trust, and acts on behalf of the AP or MP beneficiary, without disclosing the identity of the trust assets (the portfolio securities exchanged with the ETF) to the AP for some period of time including permanently, but the AP directs the occurrence of the buy and sell events. At step 606 the AP representative liquidates the portfolio securities identified for the redemption in a manner that ensures that the identity of the securities in the redemption is not disclosed to the AP or the market for some period of time including permanently. The AP representative may liquidate the portfolio securities by selling them in the market, and the AP representative then provides the funds resulting from the sale to the AP. Alternatively, the trustee may obtain other transferable assets and provide them to the AP. A As noted previously, the examples of FIGS. 1-6 apply equally to collective investment vehicles, MP's and MP representatives.

In some embodiments, the basket of securities selected for delivery to the AP or the MP representative may be made up of a proportionate share of all the securities held by the ETF or other collective investment vehicle. Alternatively, the basket composition may be determined at the discretion of the ETF or other collective investment vehicle manager. In this way, the manager may selectively reduce the fund's holdings in one or more particular securities. In some embodiments it may be desirable to place some limitations on the basket of portfolio securities provided to the AP or the MP representative. Primarily, any such limitations or restrictions are intended to ensure that the selection of the portfolio securities delivered during a redemption does not place an undue burden on the AP or the MP representative. In this regard, the manager may be required to ensure that the basket does not include an undue concentration of any particular security. The concentration of any security may be specified as a percentage of the overall value of the basket. Alternatively, the basket may be restricted based in part on the relative liquidity of the securities. That is, the quantity of any particular security in the redemption basket may be limited by a percentage of the average daily trading volume of that security. In one embodiment, the server 168 includes a software module to ensure the redemption baskets comply with the necessary restrictions.

Redemption events include providing the ETF or other collective investment vehicle with the fund's shares in exchange for the portfolio securities. While the AP or the MP representative in actively managed ETF or other collective investment vehicle embodiments receives the portfolio securities from the ETF or other collective investment vehicle during redemption, the fund shares may be provided directly to the ETF or other collective investment vehicle by the AP or the MP. Alternatively, the AP or MP may first provide the AP or MP representative with the shares of the ETF or other collective investment vehicle, thereby allowing the AP or MP representative to provide the fund shares to the ETF or other collective investment vehicle as part of a redemption event.

A further aspect of the ETF or other collective investment vehicle operation is the calculation and reporting of the intraday indicative value, or IIV. The IIV may also be referred to as the underlying trading value, indicative portfolio value, or the like. In one embodiment, the collective investment vehicle may itself calculate the IIV and provide the IIV to a service for publication. In another embodiment, the collective investment vehicle may contract with a service to calculate the IIV on its behalf and provide the IIV for publication. In one embodiment, in order to maintain the confidentiality of the holdings of a managed ETF or other collective investment vehicle, the ETF or other collective investment vehicle 102 may provide partial position information 136, 142 to a plurality of pricing agents, such as pricing agent 112 and pricing agent 114. Preferably, a plurality of partial position data records containing partial position information is electronically transmitted to a plurality of pricing agents. The partial position information includes security identifiers, and in some embodiments, corresponding quantity information, for different subsets of the portfolio holdings, for different pricing agents. The partial position information 136, 142 may also include some erroneous stock identifiers and/or the ETF or other collective investment vehicle may maintain a token number of a variety of securities in order to further mask the exact makeup of the ETF or other collective investment vehicle holdings. The pricing agents then provide partial pricing data 138, 144 to the intraday indicative value (IIV) consolidator 116. Preferably, the consolidator 116 electronically receives the partial pricing data. The partial pricing data is preferably the value of the partial positions. The IIV consolidator 116 may then combine the partial pricing data into a composite consolidated price, or preferably using a secure server for automatically computing an intraday indicative value (IIV). In the event that erroneous stock identifiers and positions were included in the partial position information, these values are subtracted by the IIV consolidator 116 during the calculation.

Alternatively, the IIV consolidator 116 may be the ETF or other collective investment vehicle custodian, or another entity that has authorized access to the confidential identity of the holdings of the managed ETF or other collective investment vehicle, and may compute the pricing information directly without the use of a pricing agent. The IIV consolidator provides ETF or other collective investment vehicle quotes 140 to customer 108 (and to markets 110 generally) by electronically publishing the IIV via a data communication feed. By using a plurality of pricing agents, the ETF or other collective investment vehicle manager is able to maintain the confidentiality of the precise makeup of the ETF or other collective investment vehicle 102. Methods of performing the IIV calculation and consolidation are disclosed in application Ser. No. 11/838,681, filed on Aug. 14, 2007. This application is hereby incorporated by reference in its entirety for the purpose of combining embodiments disclosed therein with the disclosure herein, and for all other purposes.

Figure 7B:
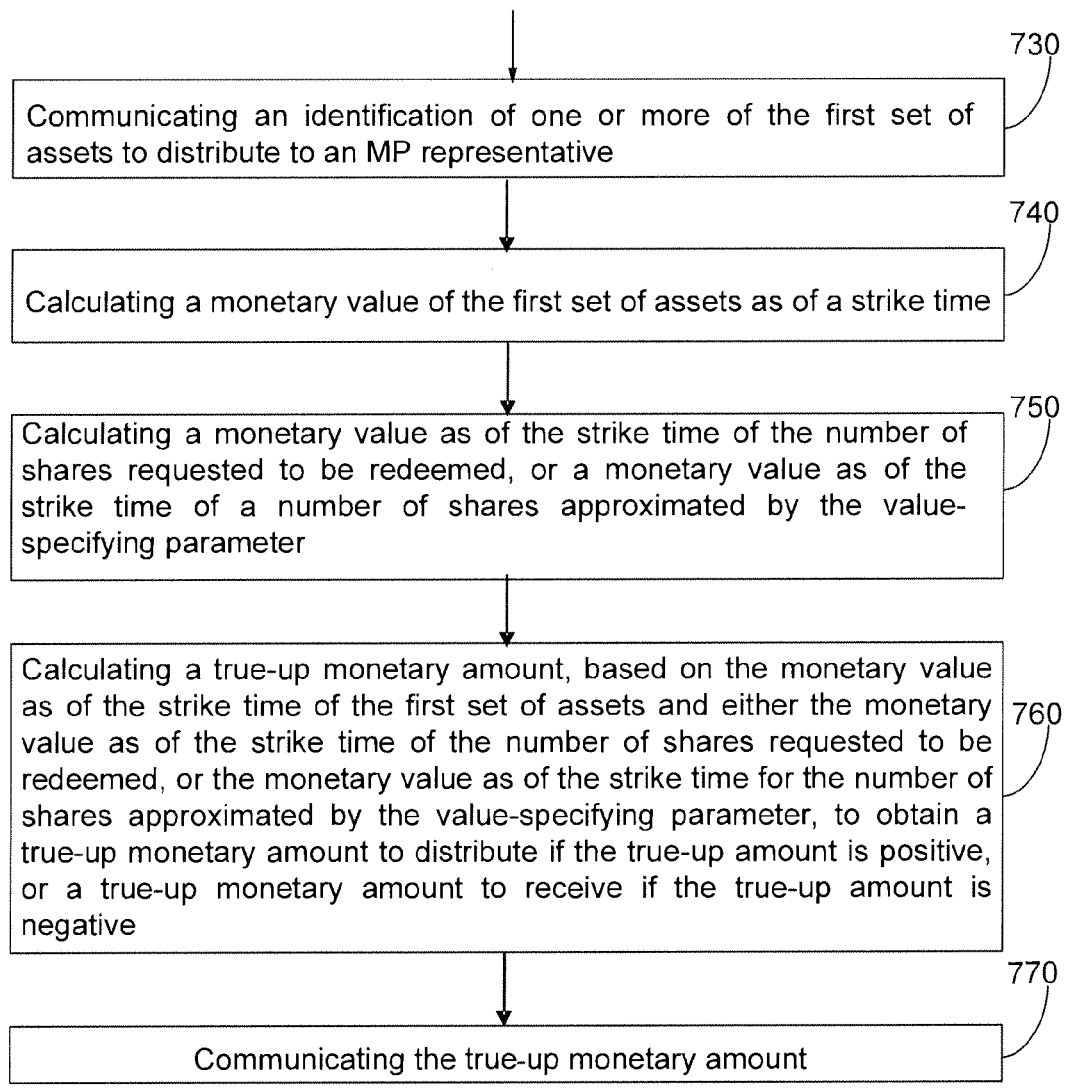

Referring to FIG. 7, one embodiment of a system, method and program product for administering a collective investment vehicle with a portfolio of securities, in relation to one or more market participants (MP's) is illustrated. As noted above, such a collective investment vehicle may comprise, by way of example but not by way of limitation, an exchange-traded fund (ETF) or a mutual fund. With reference to FIG. 7, block 700 comprises an operation of performing a creation event for a collective investment vehicle. The creation event would comprise an operation of receiving a request to create shares of the collective investment vehicle, receiving an asset from one of the MP's or on its behalf in relation to the creation event. The asset may comprise anything of value for which the MP would be willing to issue shares of its fund. In one embodiment, the asset received may comprise one or more securities for a creation basket in an account transfer from or on behalf of the one MP and/or cash from or on behalf of the one MP or a combination thereof. Note that the use of the word "comprising" is always intended to be open-ended. The collective investment vehicle manager would then issue shares directly or indirectly to the respective one MP based on the asset received. In one embodiment, the fund shares are transferred to the MP by sending an electronic message, by one or more computers and an electronic network, to a clearing agency, e.g., the DTC, to provide fund shares of the collective investment vehicle to an electronic account for the MP, or the electronic account of the MP representative. As noted previously, the fund share creation may be accomplished by the DTC or other clearing entity performing a book entry movement by executing an accounting entry to move or create securities for account.

Block 702 of FIG. 7 comprises an operation of obtaining securities for the collective investment vehicle to become a part of the portfolio of securities. This operation may be performed manually, or electronically. For example, securities for the collective investment vehicle may be obtained by the collective investment vehicle receiving into its electronic account the securities. As noted, this may occur when the DTC or other clearing entity performs a book entry movement by executing an accounting entry to move securities from an account of a securities owner account to the account for the collective investment vehicle. The method of obtaining the securities is not limiting on the invention.

Block 704 of FIG. 7 comprises an operation of obtaining or creating an electronic record of security identifiers for the portfolio of securities held by the collective investment vehicle. This operation may comprise receiving an data keyed into a computer interface, or receiving data from a network, to name a few. The method of obtaining the electronic record of the security identifiers is not limiting on the invention.

Block 706 of FIG. 7 comprises an operation of calculating and disseminating automatically an intraday indicative value (IIV), by one or more computers programmed to calculate the IIV, with the calculating based on or derived from the electronic record of the portfolio of securities in the collective investment vehicle, or transmitting data electronically, by the one or more computers, of contents of the portfolio of securities to one or more third parties for a calculation and dissemination of the IIV. Note that the operation of calculating is intended to encompass having the IIV calculated on behalf of the collective investment vehicle by one or more third parties for dissemination. Examples of such third party calculation for a confidential portfolio have been previously disclosed using one or more pricing agents and a consolidator.

Blocks 708-770 of FIG. 7 comprise an operation of performing a redemption event. Block 708 comprises an operation of receiving a request to redeem shares of the collective investment vehicle for a given MP, with the request to redeem shares comprising a number of shares to redeem or a value-specifying parameter. In one embodiment, the request may be received by one or more computers of the system, via an electronic communication network. Alternatively, the request may be received by facsimile, or by telephone, or by letter, to name a few, and the data from the request keyed into the system computers. In the case of a request to redeem a number of shares, the request may include a specific number, e.g., 1000 shares to be redeemed. Examples of such requests and the calculations operations to process the redemption of a specific number of shares are provided below. Alternatively, or in addition, the request to redeem shares of the collective investment vehicle may comprise a value-specifying parameter for at least approximating a number of shares to be redeemed. For example, the communication may request a redemption of $100,000 worth of shares. Note that this is a number that approximates a number of shares for redemption. The actual number of shares to be redeemed will be determined based on a price of a share of the collective investment vehicle determined by a prescribed valuation algorithm for a given strike time, examples of which are described below. The calculation entailed by receipt of such a value-specifying parameter, in one embodiment, comprises dividing $100,000 by the determined share price a the strike time. This share number calculation will, in many cases, result in a whole number of shares plus a fractional share. In many exchange system embodiments, fractional shares are not traded. Thus, for the $100,000 redemption example, shares equal to only $99,500 may be redeemed, with a $500 fractional share remaining, which is not traded. This is described in an example below. However, this system will operate equally well in exchanges that do trade fractional shares of the collective investment vehicle.

Block 710 in FIG. 7 comprises an operation of determining a distribution value of assets for a distribution event, based on the number of shares to redeem, or based on the number of shares determined from the value-specifying parameter, or the value-specifying parameter itself. In one implementation, this determining operation comprises, calculating, by one or more computers, a distribution value of assets for the distribution event. By way of example, if 1000 shares are requested to be redeemed in the redemption request or are determined based on the value-specifying parameter, then 1000 is multiplied by an estimated value of a share of the collective investment vehicle determined using a valuation algorithm. The valuation algorithm may be pre-determined or may be determined at the time of the redemption request. The determination or the pre-determination of the valuation algorithm may be made by the manager of the collective investment vehicle, or made by the MP making the redemption request, or his/her agent or representative, or it may be pre-determined based on an agreement between the collective investment vehicle and the MP making the redemption request, or his/her agent or representative, or by other agreement.

The algorithm used to determine the share value of the collective investment vehicle may be simply to use the then-current value of the share in the market at a time of the receipt of the redemption request, or at a prescribed time on a given day, e.g., 3:30 pm on the day of receipt of the request. Alternatively, it may be an estimate of the share value at the market close or at a given time, based on one or more share value projection algorithms. Non-limiting examples of other algorithms that may be used to calculate the value of the shares to be redeemed at a given time are a last sale price for an asset, quotation information such as a bid price, offer price, or median or other point between the bid price and the offer price for the asset, or an algorithm-based calculation based on VWAP (value weighted average price), or an algorithm-based calculation based on PWAP (price-weighted average price of the shares of the asset), or an algorithm-based calculation based on a straight average price of the shares of the asset traded over the course of a period of time, or an algorithm-based calculation based on an average of a share price of the asset traded over the course of a period of time, but excluding a last trade, or excluding the highest and/or lowest share price, among others. These examples name just a few of the possible prescribed algorithms that may be used to perform this calculation.

Note that the distribution value calculation of block 710 is performed at a different time from a calculation of the value of the shares of the collective investment vehicle made for purposes of determining a true-up amount, to be discussed below. Regarding the timing of the calculation, in one embodiment, the calculation is made at a time the request to redeem is received. In another embodiment, the calculation is performed at a later time, such as 3:30 pm.

In the case where the redemption request comprises a value-specifying parameter, the determination of block 710 may simply comprise taking the value-specifying parameter from the redemption request and designating/using that value as the distribution value. This is the case where the value-specifying parameter is simply a currency value in a redemption instruction, e.g., "Please redeem $100,000 of shares of the collective investment vehicle." Alternatively, a calculation, by one or more computers, may be performed if the value-specifying parameter is not directly usable as the distribution value, such as if the value-specifying parameter is in currency that is not usable by the collective investment vehicle, or is in some other form not directly useable. The algorithm for converting this value-specifying parameter to a distribution value is not limiting on the invention.

Block 720 comprises an operation of determining, based at least in part on the distribution value of block 710, a first set of one or more assets to distribute for the distribution event, comprising commodities, or securities (e.g., equities, bonds, to name a few), or legal instruments, or comprising at least two selected from a group of cash, commodities, securities or other legal instruments.

Note that the assets chosen to cover the distribution value may comprise a slice that reflects the composition of the assets making up the collective investment vehicle. Alternatively, the assets chosen may reflect an investment strategy of a manager of the collective investment vehicle. For example, for an actively traded collective investment vehicle, the manager may decide that he/she wants to reduce or eliminate his/her position in a particular asset or set of assets. Thus, the first set of assets to distribute may comprise shares of just one asset, or shares of just two assets to be reduced or eliminated from the collective investment vehicle. In one embodiment, the number of shares of the one or more assets and the mix of assets to be distributed for the redemption is determined by computer, based at least in part on the number of shares set forth in the request to redeem, or on the value-specifying parameter set forth in the request to redeem. Another criterion that may be used to select the first set of assets for the distribution comprises a gain or loss that will be realized from a sale or transfer of particular lots of the given asset, if included in the first set of assets for distribution.

Block 730 comprises the operation of communicating before a strike time an identification of the first set of one or more assets to distribute including a number of each one of the assets, to a market participant representative (MP representative), acting on behalf of the given MP for which the collective investment vehicle shares were received, which MP representative is governed by an agreement imposing a restriction on liquidation and disclosure of the first set of assets. To facilitate this operation, a requirement is made to establish the respective MP representative to act for the respective given MP in at least one or more redemption events with the collective investment vehicle, subject to terms that govern the actions of the MP representative and at least requires a confidentiality restriction regarding an identity of all or a portion of the first set of one or more assets with respect to the MP and a liquidation parameter for all or a portion of the first set of one or more assets. As noted previously for the AP representative, the particular method of imposing the requirement to appoint an MP representative to represent the MP at least for redemptions of collective investment vehicle shares is not limiting on the invention. This step may be implemented by the collective investment vehicle appointing an MP representative, or requiring appointment of an MP representative. A requirement for an MP representative may comprise the collective investment vehicle requiring the clearing system that facilitates transfer of the collective investment vehicle shares, e.g., the DTC, to only accept redemptions and/or creations for its collective investment vehicle shares from MP's represented by respective MP representatives, or to only accept order transfer communications on forms that automatically set up an MP representative. In one embodiment, the collective investment vehicle may enter into an agreement with the MP to appoint an MP representative. In another embodiment, a purchase of a share of the collective investment vehicle may automatically appoint an MP representative. In another embodiment, the collective investment vehicle may have a right of approval of the MP representative or other input into the selection of the MP representative, and may specify specific provisions on confidentiality and liquidation.

The purpose of this communication is to permit the MP or its representative to transform a different set of assets in the marketplace. In one embodiment, this communication takes place in advance of an actual delivery of the first set of assets thereto. For example, the actual distribution of the first set of assets to the account of the MP or its representative may take place the same day (T+0), the next day (T+1), two days later (T+2), three day later (T+3), or at some other time. This advance notification allows the MP, or its representative to sell or place contracts to sell one or more of the first set of assets in advance of the actual delivery of the first set of assets. In one embodiment, this communication operation is performed electronically by telephone, by email, Fax, by cell phone text messaging, or other convenient communication method. As an example, the communication may be implemented by Push software at a server on behalf of the manager of the collective investment vehicle in response to an input of a number of shares to be redeemed into a graphical user interface provided by the server of the collective investment vehicle.

Block 740 comprises a computer-implemented operation of calculating, by the one or more computers, a value of the first set of assets as of a strike time based on price data valid as of the strike time. Note that the result of this calculation will be used in a true-up calculation to be discussed below for block 760 and the strike time is the time that is agreed for the true-up valuation. The strike time may be a market close time for the day the redemption request was received. Alternatively, the strike time may be a different time determined by the manager of the collective investment vehicle, or the MP or representative of the collective investment vehicle, or by agreement. The algorithm used for the calculation may be a last sale price for an asset, quotation information such as a bid price, offer price, or median or other point between the bid price and the offer price for the asset, or an algorithm-based calculation based on VWAP (value weighted average price, i.e., a number of shares traded for a given asset used to weight the price for the shares), or an algorithm-based calculation based on PWAP (price-weighted average price of the shares of the asset), or an algorithm-based calculation based on a straight average price of the shares of the asset traded over the course of a period of time, or an algorithm-based calculation based on an average of the price of a share of the asset traded over the course of a period of time, but excluding a last trade, or excluding the highest and/or lowest share price, to name a few.

Block 750 comprises a computer-implemented operation of calculating, by the one or more computers, either a monetary value as of the strike time of the number of shares requested to be redeemed, or a monetary value as of the strike time of a number of shares approximated by the value-specifying parameter. Note that the result of this calculation will be used in a true-up calculation to be discussed below for block 760. The algorithm used for the calculation may be one or more of those algorithms listed above for the other calculations, or a different algorithm. The valuation method selected for valuing the shares of the collective investment vehicle may be the same method used to value the first set of assets, or may be a different method.

Block 760 comprises a computer-implemented operation of calculating a redemption true-up monetary amount to distribute, or a true-up monetary amount to receive, depending on the result of the calculation. The redemption true-up monetary amount is determined based on the monetary value at the strike time of the first set of one or more assets and either the monetary value as of the strike time of the number of shares requested to be redeemed, or the monetary value as of the strike time comprising a number of shares approximated by the value-specifying parameter, to obtain the redemption true-up monetary amount. In one embodiment, the redemption true-up amount is determined by calculating, by one or more computers, a difference between the value determined at the strike time of the first set of one or more assets and either the monetary value at the strike time of the number of shares requested to be redeemed, or the monetary value at the strike time comprising a number of shares approximated by the value-specifying parameter. In one embodiment, a value of any fractional share is not included in the true-up amount. In another embodiment, the value of the fractional share is added to the positive or negative number comprising the true-up amount.

Block 770 represents an operation of communicating an amount based, at least in part, on the true-up monetary amount. In one embodiment, the true-up amount itself is communicated to the MP or MP representative. In another embodiment, an amount of a fractional share is added to the calculated true up amount. In another embodiment, one or more other amounts are added to or subtracted from the true-up amount based on details pertaining to the particular MP for other transactions of that MP. In one embodiment, this communication operation is performed electronically by telephone, by email, by cell phone text messaging, or other convenient electronic communication method. In one embodiment, the communication may be implemented by Push software at a server on behalf of the manager of the collective investment vehicle. In another embodiment, the communication operation comprises sending an electronic message, via one or more computers and one or more networks, to cause a clearing system to transfer an amount equal to the true-up amount. By way of example, the electronic message may be sent to the DTC or other clearing system, as discussed herein, to cause the transfer of assets between electronic accounts. Note that in one embodiment where the true-up amount has one sign, e.g., positive, there may be a transfer of assets equal to the amount of the true-up value from an account of the collective investment vehicle to an account of the MP or its MP representative. Alternatively, if the true-up amount has the opposite sign, e.g., negative, the transfer caused may be to transfer assets equal to the amount of the true-up value from an account of the MP or its MP representative to the account of the collective investment vehicle.

Block 780 comprises an operation of sending by the one or more computers and an electronic network, an electronic message to cause a transfer of all or a portion of the first set of assets directly or indirectly to an electronic account of the MP representative. Note that the timing of the transfer of this first set of assets is not limited by the timing of the communication of block 730 or the true-up operation. In one embodiment, the electronic message is to the DTC or other clearing system to cause transfer of the shares to be redeemed to an account of the MP or its MP representative, or another designated third party. Note that in one embodiment, steps 770 and 780 may be combined. Note that this distribution of the first set of assets to the account of the MP or its MP representative may take the same day (T+0), the next day (T+1), two days later (T+2), three day later (T+3), or at some other time. In an alternate embodiment, the transfer amount may be effected directly by computers of the collective investment vehicle.

In one embodiment, the collective investment vehicle comprises a plurality of the securities in a confidential portfolio of securities. Alternatively, the collective investment vehicle may has a non-confidential portfolio, but the portfolio is actively managed so that it is desirable to maintain trades confidential for some period of time, e.g., 1 hour, several hours, 1 day, 2 days, 3 days, 1 week, to name a few, including permanently. In this embodiment, the system imposes a requirement directly, or it is imposed indirectly on its behalf, for an appointment of an MP representative for the market participant (MP) to maintain confidentiality of the identity of some or all of the first set of assets being traded/redeemed relative to the MP and to transform at least a portion of the first set of assets distributed, into a second set of one or more assets that are different from the first set of assets. Alternatively, the MP representative may be required simply to maintain confidentiality of the composition of the first set of assets and not disclose the composition of the first set of assets to the MP for some period of time including permanently. For embodiments requiring a transformation of the assets, the transformation may be into cash, or into different securities, for example. A contract may be executed directly with the MP representative, or directly with the MP or another third party to require that the MP representative maintain confidentiality of the composition of the first set of assets and not disclose the composition of the first set of assets to the MP, and/or to transform/liquidate part of all of the first set of assets received to ensure that any assets delivered to the MP do not disclose the composition of the trade. In one embodiment, the same type of contract would be set executed, as that described herein for Authorized Participant representatives, as described previously.

This embodiment further comprises that the electronic message, in the step of sending an electronic message to cause transfer of the first set of assets, has an electronic address or other information to cause, transfer of the first set of assets only to the account of the MP representative on behalf of the MP.

In one embodiment, the request to redeem is an electronic request received via the one or more electronic networks and the one or more computers.

In a further embodiment, the determining the first set of assets to distribute comprises: calculating, by the one or more computers, a profit value or a loss value for each of a respective one or more purchase lots of each of a plurality of the securities in the portfolio of securities; and selecting securities to distribute in the first set of assets, in part based on the profit value or loss value for each of the respective one or more purchase lots of the plurality of securities. In one embodiment, the calculation of a profit value or a loss value is made for all purchase lots of each of the securities in the portfolio of securities in the collective investment vehicle, and a selection of which lots to transfer as part of the first set of assets, is determined, based at least in part, on this profit or loss calculation.

In a yet further embodiment, the operation is performed of sending an electronic message, by the one or more computers, to cause a distribution of assets of the collective investment vehicle equal to the true-up monetary value if the true-up monetary amount is positive.

In a yet further embodiment, the calculating a true-up monetary amount step comprises determining a difference of the value of the first set of assets as of a strike time, from the monetary value as of the strike time, of the number of shares that were requested for redemption.

In a yet further embodiment, the collective investment vehicle is an exchange traded fund (ETF), and the MP is an authorized participant (AP), and further comprising appointing or requiring appointment of a respective authorized participant representative (AP representative) to act for the respective authorized participant (AP) at least in redemption events with the ETF, with the appointment including instructions that require confidentiality of an identity of one or more of the securities in the first set of assets of the ETF, with the respective AP representative being independent from the respective AP at least to the extent that the respective AP representative cannot be forced by the respective AP to disclose one or more of the identities of the first set of assets for the redemption; and wherein in this embodiment the causing distribution step comprises sending, by the one or more computers and an electronic network, an electronic message to authorize or otherwise initiate a process of transfer one or more of the first set of assets only to the account of the AP representative.

In a further embodiment, one or more of the steps of calculating comprises directing by contract a third party to perform by computer the calculating step on behalf of the collective investment vehicle using one or more prescribed algorithms, and having the third party perform the calculating step for one or more prescribed times. For example, the calculation may need to be performed before a time, such as 3:30 pm, or at or after market close time, or at another time.

In a further embodiment, one or more of the steps of calculating comprise directing by contract a third party to perform at least one of the steps on behalf of the collective investment vehicle.

In a yet further embodiment, the collective investment vehicle further comprises a plurality of securities in a confidential portfolio of securities, and the method further comprises entering one or more agreements with one or more third parties, directing the one or more third parties to perform on its behalf at least one of the calculating steps using one or more prescribed algorithms and with the calculation to be performed with specified data for prescribed times, wherein the one or more agreements require the third parties to maintain in confidence information about contents of the portfolio of securities of the collective investment vehicle and/or trades therefor; and transmitting electronically, by the one or more computers and an electronic network, information relating to the confidential portfolio of securities to at least one third party that is directed to perform at least one of the calculating steps. For example, this one or more calculations may be for obtaining the IIV.

In a further embodiment, the collective investment vehicle is an exchange traded fund (ETF) and the MP is an authorized participant (AP), and the AP is represented by an authorized participant representative (AP representative) appointed to act for the respective authorized participant (AP) at least in redemption events with the ETF, with the appointment including instructions requiring the AP representative to maintain confidentiality from and not disclose to the AP a composition of one or more of the first set of assets of the ETF to be delivered or provided in redemption or creation events, and directly or implicitly requires the AP representative to transform through liquidation one or more of the first set of assets into cash or other one or more legal instruments in order to maintain such confidentiality. This embodiment further comprises the steps of receiving, by the one or more computers and one or more electronic networks, a given number of ETF shares requested to be redeemed as part of a request to redeem. This receiving step may comprise, in one embodiment, receiving into an electronic account held by the ETF in a clearing system, such as the DTC, a number of shares of the ETF transferred into the account. This embodiment further comprises distributing the first set of assets only to the AP representative. This distributing step may be performed, in one embodiment, by sending an electronic message, by the one or more computers and one or more electronic networks, to cause one or more securities of the portfolio of the ETF to be transferred to an electronic account held by the AP representative in the clearing system. In one embodiment, the method comprises sending an electronic message to the AP representative to identify one or more of the first set of assets before the market close. In a further aspect, the redemption true-up monetary amount is transferred electronically to an account held by the AP representative.

In a further embodiment, where the collective investment fund is an exchange traded fund (ETF) that maintains a confidential portfolio of securities, the method further comprises the steps of contracting with a third party to calculate an intraday indicative value (IIV) or a portion thereof under confidentiality; and transmitting electronically, by the one or more computers and the one or more networks, a composition of the confidential portfolio of securities in the ETF or a portion thereof to the third party for calculating the IIV or a portion thereof. The step is then performed of publishing or having published the calculated IIV, as described herein.

In a yet further embodiment, the collective investment vehicle computers may generate an application programming interface (API) to receive requests to redeem shares of the collective investment vehicle. The API may be made available on a website or via another network connection. The collective investment vehicle computers may be programmed to aggregate a number of shares from a plurality of requests to redeem shares and/or to create share obtained over some period of time, or aggregated until at least a threshold total redemption amount is reached, to obtain a total number of shares to redeem in the method for redemption. This operation may facilitate retail redemptions and/or creations. In one embodiment, the collective investment vehicle may contract with one or more third parties to maintain a website or other aggregation site available on a website or via another network connection to aggregate on behalf of the collective investment vehicle a number of shares from a plurality of the requests to redeem shares and/or to create shares, and then provide to the collective investment vehicle a total number of shares to redeem for the redemption event or a total number of shares to create for the creation event.

Note that in some embodiments there may not be a need for performance of the disclosed true-up operation when performing redemptions, if a redemption basket is published or otherwise made available to the MP or his/her MP representative or other agent initiating a redemption request, and the redemption basket represents the actual portfolio of securities held by the collective investment vehicle. The accessibility of the redemption basket that represents the portfolio may indicate that only the securities and other assets and their proportions listed in the redemption basket are to be transferred in a redemption event with this MP. Accordingly, in one embodiment, the method and system may further comprise determining if a redemption basket for the collective investment is disclosed; and only performing the steps for the redemption event in accordance with the method when the redemption basket for the collective investment vehicle is not disclosed. In a further embodiment, the method comprises determining if a disclosed redemption basket for the collective investment represents or does not represent the actual portfolio of the collective investment vehicle; and only performing the steps for the redemption event in accordance with the method when the redemption basket for the collective investment vehicle does not represent the actual portfolio of the collective investment vehicle. These "only performing" steps encompass, but are not limited to, triggering performance of the method, or preventing the performance of the method. Note that the step of determining if a redemption basket for the collective investment represents or does not represent the actual portfolio of the collective investment vehicle may be obtained by accessing a database or a webpage or other network site, or may keyed into the system by the manager or another. The method of making this determination is not limiting on the invention.

Note that the step of determining if there is a redemption basket disclosed may be performed, in one embodiment, by accessing a database or a website or other network address. In another embodiment, the determining step may be performed manually by the manager of the collective investment vehicle, or on his/her behalf. In another embodiment, the determining step may include a step of determining whether or not to make disclosure of a redemption basket to the given MP initiating the request or its agent to redeem based on one or more criteria, such as, for example, a quantity of the redemption order, or a relationship with the collective investment vehicle, or a relationship with another entity, such as the clearing system, to name a few. This step of determining whether or not to disclose a redemption basket to the particular MP may be determined on the fly, or may be performed earlier, and then recorded in a database or at another network address.

In a further embodiment, the method and system comprises determining whether to net collective investment vehicle shares from one or more creation events with shares from one or more redemption events based on one or more criteria; if a determination is made to perform netting, then netting shares from one or more of the creation events with shares from one or more of the redemption events to obtain a net number of shares; and using the net number of shares in the performance of the creation event or the performance of the redemption event. Note that the operation of determining whether to net collective investment vehicle shares from one or more creation events with collective investment vehicles shares from one or more redemption events may be performed by accessing a database, or a webpage or other network address. In another embodiment, a determination of whether or not to net may be performed manually by the manager of the collective investment vehicle based on criteria such as a reduction of administrative cost or a reduction of SEC fees, or based on a manager investment objective with respect to retaining or transferring out various lots of securities, to name a few. The one or more criteria on which to base the determination to net is not limiting on the invention. The manager determination may be keyed into a database, or a web page or other network address and may specify netting for redemption requests and creation requests received over a period of time, such as an hour, or multiple hours, or up to a cutoff point, or a day, to name a few. Alternatively, the manager determination may be made on the fly by selecting a set of one or more specific requests to redeem and one or more specific requests to create that have not yet been acted upon. In another embodiment, the determination may be performed automatically, by the one or more computers, based on one or more computers.

If it is determined that netting is to be performed, then the step is performed of netting shares from one or more of the creation events with shares from one or more of the redemption events to obtain a net number of shares. The netting may be performed, in one embodiment, by the one or more computers netting the shares from selected requests to redeem shares and selected requests to create shares, with the selection based on one or more criteria, such as the quantity of shares in the respective requests, or an identity of the MP's making the respective requests, to name a few. Alternatively, the netting may be performed manually, and a net number of shares resulting keyed into the system. This net number of shares would then be used in the method and system in the performance of the creation event or the performance of the redemption event, depending on whether the net results in a number of shares to be created or results in a number of shares to be redeemed.

A set of true-up calculations are set forth below, by way of example and not by way of limitation. Note that these examples apply equally to other collective investment vehicles.

Example 1

Basic Redemptions with True-Up

ABC is an ETF each share of which consists of 1 share of AAA and 1 share BBB
Before 3:30 PM (Redemption Window Close):
Customer notifies an AP broker of a desire to redeem 1000 shares of ETF ABC. Fund manager establishes a basket of a first set of one or more assets for redemption comprising—2 shares of AAA to be distributed for each redeemed share of the ETF ABC, selected by the manager as part of his/her strategy to reduce the number of shares of AAA in the ETF portfolio. The fund manager has previously established a strike time for the transactions as 4:01 pm, just after a market close of 4:00 pm.
3:30 PM (Redemption Window Close):
The INAV for one share of ABC (indicative net asset value at a time before the close time) is $100 (and one share AAA has a last trade price at 3:30 PM $50, BBB has a last trade price at 3:30 PM $50)
ETF notifies the broker's AP Representative of delivery of 2000 shares of AAA for his redemption of 1000 ABC
The AP Rep. then places an order to Sell 2000 AAA at Market On Close for that day.
4:01 PM (True Up Strike Time):
The Closing NAV of ABC is $99.99 (AAA has a close price at 4:00 PM $49.99, BBB has a close at 4:00 PM $50.00)
Closing value of the first set of one or more assets selected for redemption is $99.98 (2 shares of AAA with a close price at 4:00 PM of $49.99)

$$\begin{aligned}\text{True Up Calc} &= (\text{Closing } NAV \text{ of } ABC\ \$99.99 \text{ minus Closing value} \\ &\quad \text{of redemption basket of } \$99.98 \text{ per share of } ABC) * \\ &\quad \text{shares for redemption}) \\ &= (\$99.99 - \$99.98) * 1000 \text{ shares} \\ &= \text{positive } \$10.00.\end{aligned}$$

Result: ETF Fund Transfers $10.00 to the AP or someone on behalf of the AP.
Notes:
1. The Redemption Window Close may be any time and date in the future.
2. When the fund manager establishes the redemption basket, his/her goal is to issue a basket with the same closing value as the INAV of the fund + or minus his/her cash requirements. He/she may use techniques such as beta correlations and historical performance to best estimate the closing values of his redemption basket. The first set of one or more assets, i.e., the redemption basket itself, would be a function of his/her trading strategy.
3. The AP Representative will have previously agreed with the AP broker as to how and when to liquidate the basket in this example. The ETF's obligation for the true-up is only up to the closing value of the redemption basket. The profit or loss from any actual liquidations of the first set of one or more assets by the AP representative are at the risk of the AP representative and the AP.

Example 2

Redemptions with Variable Redemption True-Up Strike and Window Close Times

ABC is an ETF, each share of which consists of 1 share of AAA and 1 share BBB. Fund Manager establishes a Redemption Window Close at (12:00 PM) and a True-Up Strike time at (1:00 PM).
Before 12:00 (Redemption Window Close):
Customer notifies broker (the AP) of a desire to redeem 1000 shares of ETF ABC. The Fund manager establishes a basket for redemption—2 shares of AAA for each share of ABC to be redeemed.

12:00 PM (Redemption Window Close):
The INAV (indicative net asset value at a time before the close time) for one share of the ETF ABC is $100 (one share of AAA has a last trade price at 12:00 PM of $50; one share of BBB has a last trade price at 12:00 PM of $50).
The ETF Fund notifies the broker's AP Representative that 2000 shares of AAA will be delivered for his redemption of 1000 ABC. Note that the actual delivery may take place at some subsequent time. (T+1) or (T+2) or (T+3), for example.
  1:00 PM (True-Up Strike Time):
The AP Representative places an order to Sell 2000 AAA at Market. Strike time INAV (indicative net asset value at a time before the close time) of a share of ABC is $99.99 (one share of AAA has a last price at 1:00 PM of $49.99; one share of BBB has a last price at 1:00 PM of $50.00).
Strike time value of the redemption basket for a share of ETF ABC is $99.98 (=2 shares of AAA at $49.99 last price at 1:00 PM)

$$\text{True Up Calc} = (1{:}00\text{PM Strike time } INAV \text{ of } ABC \ \$99.99 -$$
$$\text{Strike time value of basket for redemption } \$99.98) *$$
$$\text{shares for redemption})$$
$$= (\$99.99 - \$99.98) * 1000$$
$$= \text{positive } \$10.00.$$

Result: ETF Fund Transfers $10.00 to the AP or someone on behalf of the AP.

Example 3

Value Specified Redemptions with True-Up

ABC is an ETF, each share of which consists of 1 share of AAA and 1 share BBB.
  Before 3:30 PM (Redemption Window Close):
A Customer notifies broker (the AP) of a desire to redeem shares of an ETF using a value-specifying parameter, e.g., redeem $100,000 worth of ABC shares. The ETF Fund manager establishes a basket for redemption of—2 shares of AAA for each share of ABC to be redeemed. The fund manager has previously established a strike time for the transactions as 4:01 pm, just after a market close of 4:00 pm.
  3:30 PM (Redemption Window Close):
ABC INAV is $100 (one share of AAA has a last trade price at 3:30 PM of $50, one share of BBB has a last trade price at 3:30 PM of $50)
The ETF Fund estimates a number of ETF shares that will equal or approximate the value-specifying parameter of $100,000 at True-Up Strike Time.
The ETF Fund manager computer determines that 1000 Shares of ABC will cover the value-specifying parameter of $100,000 at True-Up Strike Time.
The ETF Fund notifies the broker's AP Representative that 2000 shares of AAA will be delivered for the redemption of 1000 shares of ABC.
The AP Representative places order to Sell 2000 shares of AAA at Market On Close.
  4:01 PM (True Up Strike Time):
The Closing NAV of a share of ABC is $99.99 (one share of AAA has a close price at 4:00 PM of $49.99, one share of BBB has a close price at 4:00 PM of $50.00)

The Closing value of the basket chosen for redemption (the first set of one or more assets) of a share of ABC is $99.98 (=2 shares of AAA at $49.99 close price at 4:00 PM)

$$\text{True Up Calc} = (\text{Closing } NAV \text{ of } ABC \ \$99.99 - \text{Closing value of}$$
$$\text{redemption basket } \$99.98) * \text{shares for redemption})$$
$$= (\$99.99 - \$99.98) * 1000$$
$$= \text{positive } \$10.00.$$

Result: ETF Fund Transfers $10.00 to the AP or someone on behalf of the AP.
Total Proceeds to customer=$99,990
Note that depending on the agreement with the AP broker, if there is a fractional share remaining after the number of shares is determined based on the value-specifying parameter, then the value, in one embodiment may be added to the true-up value.

Example 4

Algorithmically Valued Redemptions with True-Up

ABC is an ETF each share of which consists of 1 share of AAA and 1 share BBB.
  Before 3:00 PM (Redemption Window Close):
A Customer notifies a broker (AP) of a desire to redeem 1000 shares of ETF ABC.
The ETF Fund manager establishes a basket for redemption for each share to be redeemed—2 shares of AAA for each share of ABC to be redeemed, using a last hour Volume Weighted Average Price (VWAP) for True-Up valuations.
  3:00 PM (Redemption Window Close):
The ETF Fund Begins VWAP calculations for ETF constituents.
The ETF Fund notifies the broker's AP Representative that 2000 shares of AAA are to be delivered for the redemption of 1000 shares of ABC.
The AP Representative starts selling 2000 AAA using a VWAP trading engine.
  4:01 PM (True Up Strike Time):
The Closing period of 3:00-4:00 VWAP value of ABC is $99.99 (one share of AAA is $49.99 for 3:00-4:00 VWAP, one share of BBB is $50.00 for 3:00-4:00 VWAP)
The Closing value of the basket selected for redemption of one share of ABC is $99.98 (=2 shares of AAA at $49.99 3:00-4:00 VWAP).

$$\text{True Up Calc} = (3{:}00{-}4{:}00 \ VWAP \text{ of one share of } ABC \text{ is } \$99.99 -$$
$$3{:}00{-}4{:}00 \ VWAP \text{ of redemption basket } \$99.98) *$$
$$\text{shares for redemption})$$
$$= (\$99.99 - \$99.98) * 1000$$
$$= \text{positive } \$10.00.$$

Result: ETF Fund Transfers $10.00 to the AP or someone on behalf of the AP.
Notes:
  1. Redemption Window Close and True-Up Strike time can be variable over time and date.

2. Liquidation is determined by AP as any difference between the liquidation price and True-Up and is at his/her risk.
3. Other valuation methodologies include, but are not limited to Price Weighted Average Price (PWAP), Straight average, average excluding last, to name a few.

Figure 8:
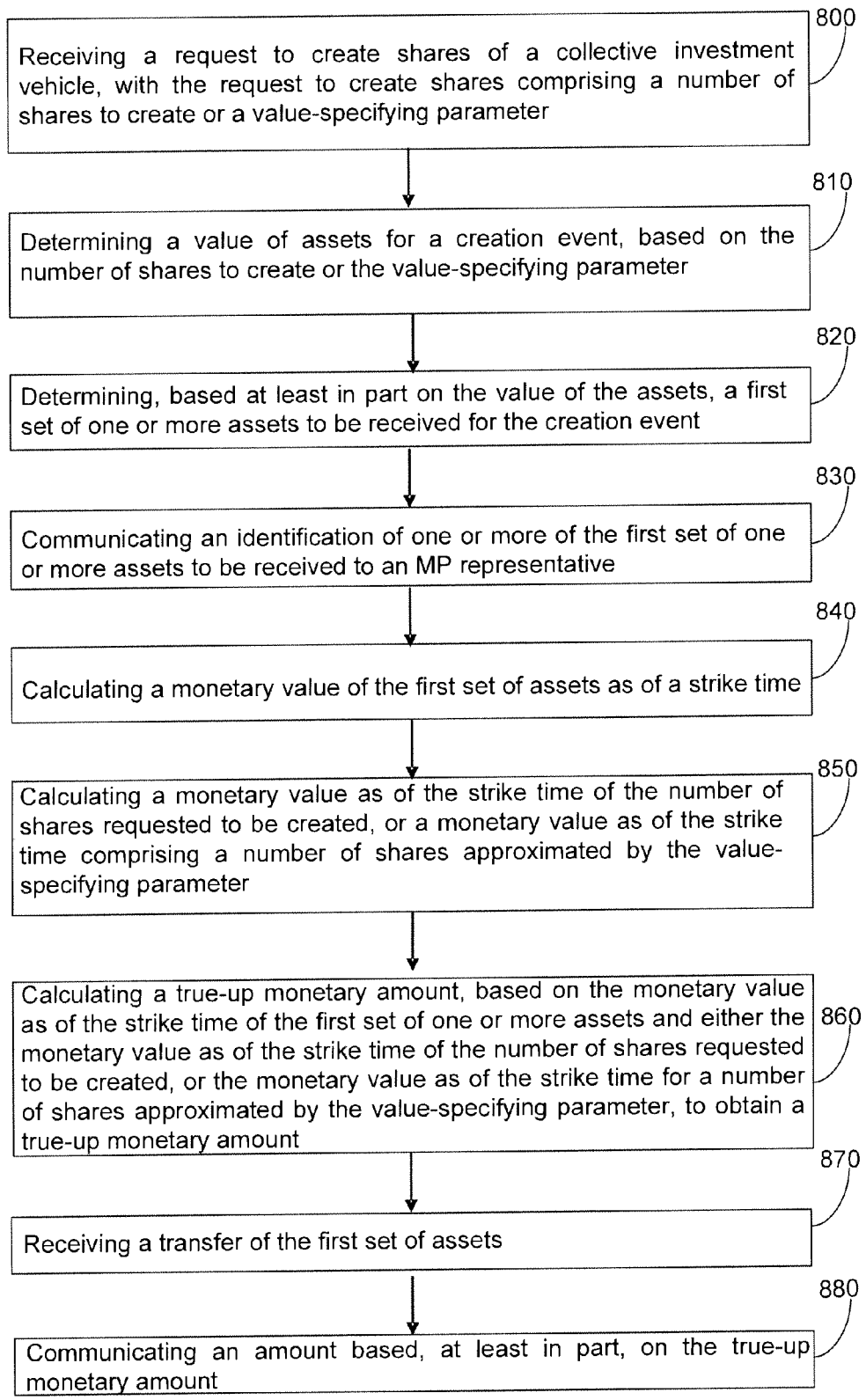
FIG. 8 is a schematic block diagram of another embodiment of the invention.

FIG. 8 illustrates a further embodiment of the true-up method, system and program product implemented for managing share creations for a collective investment vehicle. Referring to FIG. 8, block 800 comprises receiving, a request to create shares of the collective investment vehicle, with the request to create shares comprising a number of shares to create or a value-specifying parameter for at least approximating a number of shares to be created. This step may be implemented manually or electronically via a communication over one or more networks, similar to that described for block 708 of FIG. 7.

Block 810 in FIG. 8 comprises an operation of determining a value of assets for a creation event, based on the number of shares to create or the value-specifying parameter. This valuing step may be implemented electronically, using the same algorithms described for block 710 of FIG. 7, or may be valued using a different algorithm. Note that if a value specifying parameter was received in a currency amount, then the currency amount may be used as the value of the assets for the creation event, e.g., an instruction to create $100,000 worth of collective investment vehicle shares.

Block 820 in FIG. 8 comprises an operation of determining, based at least in part on the value of assets, a first set of one or more assets to receive for the creation event, comprising commodities, or securities, or legal instruments, or comprising at least two selected from a group of cash, commodities, securities or legal instruments. This step may be implemented electronically, similarly to that described for block 720 of FIG. 7. In other words, the assets determined to be received for the creation event may simply comprise a slice to be added to the collective investment vehicle. Alternatively, the assets requested may focus on one or more assets that the collective investment manager wishes to acquire to increase the collective investment vehicle holding in view of his/her investment strategy. The value of the assets determined will be based, at least in part, on the number of shares to be created or the value specifying parameter.

Block 830 in FIG. 8 comprises the operation of communicating an identification of one or more of the first set of one or more assets to be received, to an MP representative for the MP for whom the creation is taking place. This communication step may be implemented, similarly to that described for block 730 of FIG. 7. As an example, the communication may be implemented by Push software at a server on behalf of the manager of the collective investment vehicle in response to an input of a number of shares to be created into a graphical user interface provided by the server of the collective investment vehicle. Alternatively, the step may be implemented by posting an identification of the first set of assets to a website accessible by the MP representative, or may be communicated by facsimile or by telephone, to name a few.

Block 840 in FIG. 8 comprises an operation of calculating, by the one or more computers, a monetary value of the first set of assets as of a strike time. This step may be implemented electronically, similarly to that described for block 740 of FIG. 7, using one of the same valuation algorithms disclosed previously or a different valuation algorithm. The valuation algorithm selected is not limiting on the invention.

Block 850 in FIG. 8 comprises an operation of calculating, by the one or more computers, a monetary value as of the strike time of the number of shares requested to be created, or a monetary value as of the strike time comprising a number of shares approximated by the value-specifying parameter. This step may be implemented electronically, similarly to that described for block 750 of FIG. 7, using one of the same valuation algorithms previously disclosed or a different valuation algorithm. As noted, the valuation algorithm selected is not limiting on the invention.

Block 860 in FIG. 8 comprises an operation of calculating, by the one or more computers, a true-up monetary amount, based on the monetary value as of the strike time of the first set of one or more assets and either the monetary value as of the strike time of the number of shares requested to be created, or the monetary value as of the strike time comprising a number of shares approximated by the value-specifying parameter, to obtain a true-up monetary amount. This step may be implemented electronically, similarly to that described for block 760 of FIG. 7, using the same or a different algorithm for the calculation.

Block 870 in FIG. 8 comprises the operation of receiving a transfer of the first set of assets. This step may be implemented electronically, similarly to that described for block 770 of FIG. 7 via the receipt into an electronic account of the collective investment vehicle held in a clearing system, such as the DTC. In a further aspect, an electronic message may be sent to cause an electronic transfer of the shares created for this creation event to the DTC account of the MP that requested the creation or a DTC account of the representative of that MP.

Note that the same permutation apply to the creation request as were described for the redemption request. For example, the collective investment vehicle may be an ETF.

In a yet further embodiment, one or more of the steps of the method may be contracted out to be performed by one or more third parties.

Block 880 in FIG. 8 comprises an operation of communicating an amount based, at least in part, on the true-up monetary amount. This step may be implemented similarly to that described for block 780 of FIG. 7.

The system described above may include computer readable storage media for use with computer systems to effectuate certain steps described herein. In particular, the computer-readable media may contain instructions to cause a microprocessor to execute the following steps: electronically receiving partial pricing data and automatically computing an intraday indicative value (IIV); and, electronically transmitting the IIV via a data communication feed. In addition, instructions may include those for transmitting a plurality of partial position data records containing partial position information to a plurality of pricing agents.

Exemplary embodiments of the invention have been described above. Those skilled in the art will appreciate that changes may be made to the embodiment described without departing from the true spirit and scope of the invention as defined by the claims.

We claim:

1. A method for administering a collective investment vehicle with a portfolio of securities, in relation to one or more market participants (MP's), comprising:
   performing a creation event, comprising:
   receiving a request to create one or more shares of the collective investment vehicle;
   receiving an asset from one of the MP's in relation to the creation event;
   issuing, by one or more computers and an electronic network, one or more collective investment vehicle shares directly or indirectly to the respective one MP based on the asset received;

obtaining securities for the collective investment vehicle to become a part of the portfolio of securities;

obtaining or creating an electronic record of security identifiers for the portfolio of securities held by the collective investment vehicle;

calculating and disseminating automatically an intraday indicative value (IIV), by one or more computers programmed to calculate the IIV, the calculating based on or derived from the electronic record of the portfolio of securities in the collective investment vehicle, or transmitting data electronically, by the one or more computers, of contents of the portfolio of securities to one or more third parties for a calculation and dissemination of the IIV;

performing a redemption event, comprising:

receiving, a request to redeem shares of the collective investment vehicle for a given MP, with the request to redeem shares comprising a number of shares to redeem or a value-specifying parameter;

determining a distribution value of assets for a distribution event, based on the number of shares to redeem or the value-specifying parameter;

determining, based at least in part on the distribution value, a first set of one or more assets to distribute for the distribution event, comprising commodities, or securities, or legal instruments, or comprising at least two selected from a group of cash, commodities, securities or legal instruments;

communicating before a strike time an identification of the first set of one or more assets to distribute including a number of each one of the assets, to a market participant representative (MP representative), acting on behalf of the given MP for which the collective investment vehicle shares were received, which MP representative is governed by an agreement imposing a restriction on liquidation and disclosure of the first set of assets;

calculating, by one or more computers, a monetary value of the first set of assets as of the strike time based on price data valid as of the strike time;

calculating, by one or more computers, a monetary value as of the strike time of the number of shares requested to be redeemed, or a monetary value as of the strike time of a number of shares approximated by the value-specifying parameter;

calculating, by one or more computers, a redemption true-up monetary amount, based on the monetary value at the strike time of the first set of one or more assets and either the monetary value as of the strike time of the number of shares requested to be redeemed, or the monetary value as of the strike time comprising a number of shares approximated by the value-specifying parameter, to obtain the redemption true-up monetary amount;

sending, by one or more computers and an electronic network, an electronic message to cause a transfer of all or a portion of the first set of assets directly or indirectly to an electronic account of the MP representative; and further comprising:

requiring appointment of the respective MP representative to act for the respective given MP in at least one or more redemption events with the collective investment vehicle, with terms that govern the actions of the MP representative and at least requires a confidentiality restriction regarding an identity of all or a portion of the first set of one or more assets with respect to the MP and a liquidation parameter for all or a portion of the first set of one or more assets, and wherein the receiving an asset from the one MP for the creation event comprises receiving one or more securities for a creation basket in an account transfer from or on behalf of the one MP and/or cash from or on behalf of the one MP or a combination thereof.

2. The method as defined in claim 1, wherein the restriction on confidentiality is limited in time.

3. The method as defined in claim 1, wherein the restriction on liquidation imposes a timing or volume restriction for liquidation of some or all of the first set of assets.

4. The method as defined in claim 2, wherein the restriction on liquidation imposes a methodology requirement for the liquidation of some or all of the first set of assets.

5. The method as defined in claim 1, wherein the collective investment vehicle is an actively traded collective investment vehicle.

6. The method as defined in claim 5, wherein the collective investment vehicle is an exchange traded fund (ETF).

7. The method as defined in claim 1, wherein the request to redeem comprises the number of shares to be redeemed, and further comprising:

calculating, by one or more computers, using a predetermined valuation algorithm, a monetary value as of the strike time, of the number of shares that were requested for redemption; and wherein the calculating the redemption true-up amount step comprises determining a difference between the monetary value of the first set of one or more assets and the monetary value of the number of shares that were requested to be redeemed as of the strike time.

8. The method as defined in claim 1, wherein the request to redeem comprises the value-specifying parameter, and wherein the calculating the redemption true-up amount step comprises determining a difference between the monetary value of the first set of one or more assets and a monetary value of shares that equal or approximate the value of the value-specifying parameter as of the strike time.

9. The method as defined in claim 8, further comprising:

obtaining an NAV for the shares of the collective investment vehicle;

calculating, by the one or more computers, a number of shares to redeem as of the strike time based on the value-specifying parameter and the NAV for the shares of the collective investment vehicle; and communicating that number of shares to be redeemed directly or indirectly to the MP representative of the given MP.

10. The method as defined in claim 8, further comprising adding a value of a fractional share to the redemption true-up amount.

11. The method as defined in claim 7, wherein the communicating an identification of one or more of the first set of one or more assets to distribute, for the distribution event, to the MP representative for the given MP of the collective investment vehicle for whom the redemption is taking place, comprises transmitting, via the one or more computers and the one or more networks, an electronic message comprising identification information of one or more of the first set of assets, before the strike time.

12. The method as defined in claim 1,
wherein the collective investment vehicle comprises a confidential portfolio of securities.

13. The method as defined in claim 1,
wherein the receiving the request to redeem shares step comprises receiving an electronic request, via one or more electronic networks and the one or more computers.

14. The method as defined in claim 1,
wherein the determining the first set of assets to distribute further comprises:
calculating, by the one or more computers, a profit value or a loss value for each of a respective one or more purchase lots of each of more than one of the securities in the portfolio of securities;
selecting securities to distribute in the first set of assets, in part based on the profit value or loss value for each of the respective one or more purchase lots of the plurality of securities.

15. The method as defined in claim 1, wherein the strike time is a market close time.

16. The method as defined in claim 1, further comprising:
sending an electronic message, by the one or more computers and one or more networks, to cause a distribution of assets equal to the redemption true-up monetary value.

17. The method as defined in claim 1, wherein one or more of the steps of calculating, by one or more computers, comprises:
the collective investment vehicle or its agent contracting to direct one or more third parties to perform on behalf of the collective investment vehicle, by computer, one or more of the calculating steps using one or more prescribed algorithms for one or more prescribed times.

18. The method as defined in claim 1, further comprising the collective investment vehicle or its agent directing, by contract, a third party to perform at least one of said steps.

19. The method as defined in claim 1,
wherein the collective investment vehicle comprises a plurality of securities in a confidential portfolio of securities, and
further comprising:
the collective investment vehicle or its agent entering one or more agreements with one or more third parties, directing the one or more third parties to perform at least one of the calculating steps on behalf of the collective investment vehicle using prescribed algorithms, wherein the one or more agreements require the third parties to maintain in confidence information about contents of the confidential portfolio of securities of the collective investment vehicle; and
transmitting electronically, by the one or more computers and an electronic network, information relating to the confidential portfolio of securities to at least one of the one or more third parties that is directed to perform at least one of the calculating steps.

20. The method as defined in claim 1,
wherein the collective investment vehicle is an actively managed exchange traded fund (ETF) holding a confidential portfolio of securities, further comprising:
the collective investment vehicle or its agent entering one or more agreements with one or more third parties, directing the one or more third parties to perform one or more calculations on behalf of the collective investment vehicle to obtain the IIV; and
the collective investment vehicle or its agent sending an electronic message, by the one or more computers and one or more networks, to cause transfer of the redemption true-up monetary amount of funds.

21. The method as defined in claim 1, wherein the collective investment vehicle is a closed-end fund.

22. The method as defined in claim 1, wherein the collective investment vehicle is a proprietary index fund.

23. The method as defined in claim 1,
wherein the collective investment vehicle comprises a plurality of securities in a confidential portfolio of securities, and
further comprising:
the collective investment vehicle or its agent directing one or more third parties by one more contracts, to perform one or more calculations on its behalf, by computer, to obtain the IIV; and
sending, by the one or more computers and one or more networks, one or more electronic messages comprising information based on a composition of the confidential portfolio of securities, to one or more of the one or more of the third parties for making calculations.

24. The method as defined in claim 1, further comprising:
generating or having generated on its behalf, by the one or more computers, an application programming interface (API) to select one or more assets of the collective investment vehicle to distribute as the first set of assets in response to the request to redeem the shares of the collective investment vehicle.

25. The method as defined in claim 1, further comprising:
generating or having generated on its behalf, by the one or more computers, an application programming interface (API) to receive requests to redeem and/or to create shares of the collective investment vehicle;
aggregating or netting, or having aggregated or having netted on behalf of the collective investment vehicle, a number of shares from a plurality of the requests to redeem and/or create shares, by the one or more computers, to obtain a total number of shares to redeem in the redemption event or a total number of shares to create in the creation event.

26. The method as defined in claim 1, further comprising:
determining whether to net collective investment vehicle shares from one or more creation events with collective investment vehicles shares from one or more redemption events based on one or more criteria;
if it is determined that netting is to be performed, then netting shares from one or more of the creation events with shares from one or more of the redemption events to obtain a net number of shares; and
using the net number of shares in the performance of the creation event or the performance of the redemption event.

* * * * *